United States Patent
Kunjidhapatham et al.

(10) Patent No.: US 8,848,712 B2
(45) Date of Patent: Sep. 30, 2014

(54) DISTRIBUTED RSVP-TE IN A MULTI-CHASSIS NODE ARCHITECTURE

(75) Inventors: Ashok Kunjidhapatham, Bangalore (IN); Rajan Rao, Santa Clara, CA (US); Biao Lu, Saratoga, CA (US); Mohit Misra, Bangalore (IN); Sri Mohana Satya Srinivas Singamsetty, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 965 days.

(21) Appl. No.: 12/538,315

(22) Filed: Aug. 10, 2009

(65) Prior Publication Data

US 2011/0032938 A1 Feb. 10, 2011

(51) Int. Cl.
*H04L 12/28* (2006.01)
*G06F 15/173* (2006.01)
*H04L 12/46* (2006.01)
*H04L 12/913* (2013.01)
*H04L 12/775* (2013.01)
*H04L 12/931* (2013.01)
*H04Q 11/00* (2006.01)

(52) U.S. Cl.
CPC .......... *H04L 47/724* (2013.01); *H04L 12/4633* (2013.01); *H04L 45/583* (2013.01); *H04L 49/40* (2013.01); *H04Q 2011/0039* (2013.01)
USPC .......................................... 370/392; 709/226

(58) Field of Classification Search
USPC ....................... 370/392, 395.52, 401; 709/226
See application file for complete search history.

(56) References Cited

U.S. PATENT DOCUMENTS

| | | | |
|---|---|---|---|
| 7,272,651 B1* | 9/2007 | Bolding et al. | 709/227 |
| 2003/0058854 A1* | 3/2003 | Cote | 370/389 |
| 2007/0019642 A1* | 1/2007 | Lu et al. | 370/389 |
| 2008/0044181 A1* | 2/2008 | Sindhu | 398/49 |
| 2008/0155101 A1* | 6/2008 | Welsh et al. | 709/226 |
| 2008/0192762 A1* | 8/2008 | Kompella et al. | 370/410 |
| 2008/0205344 A1* | 8/2008 | Lee et al. | 370/331 |
| 2009/0097403 A1* | 4/2009 | Polk et al. | 370/231 |

OTHER PUBLICATIONS

R. Braden, "RFC 2205: Resource ReSerVation Protocol (RSVP)," Sep. 1997, pp. 19-76.*
D. Awduche, "RFC 3209: RSVP-TE: Extensions to RSVP for LSP Tunnels," Dec. 2001, p. 7-57.*

* cited by examiner

*Primary Examiner* — Dang Ton
*Assistant Examiner* — Ryan Kavleski
(74) *Attorney, Agent, or Firm* — Harrity & Harrity, LLP; David L. Soltz

(57) ABSTRACT

A network device includes a multi-chassis system in which each chassis includes a RSVP-TE protocol stack that may provide RSVP-TE services for LSP tunnels associated with each chassis. The multi-chassis system may include an administrative chassis. The administrative chassis may forward RSVP messages to other chassis of the network device. The administrative chassis may encapsulate the RSVP messages with a chassis address. The other chassis may de-encapsulate the RSVP messages and process the RSVP messages according to the RSVP-TE protocol. The administrative chassis may obtain session information associated with other chassis based on RSVP messages received. The administrative chassis may manage adjacency mechanisms and failure and recovery mechanisms. The multi-chassis system including the distributed RSVP-TE protocol stacks may minimize scalability issues and improve performance when high-capacity routing and/or switching services are needed.

25 Claims, 18 Drawing Sheets

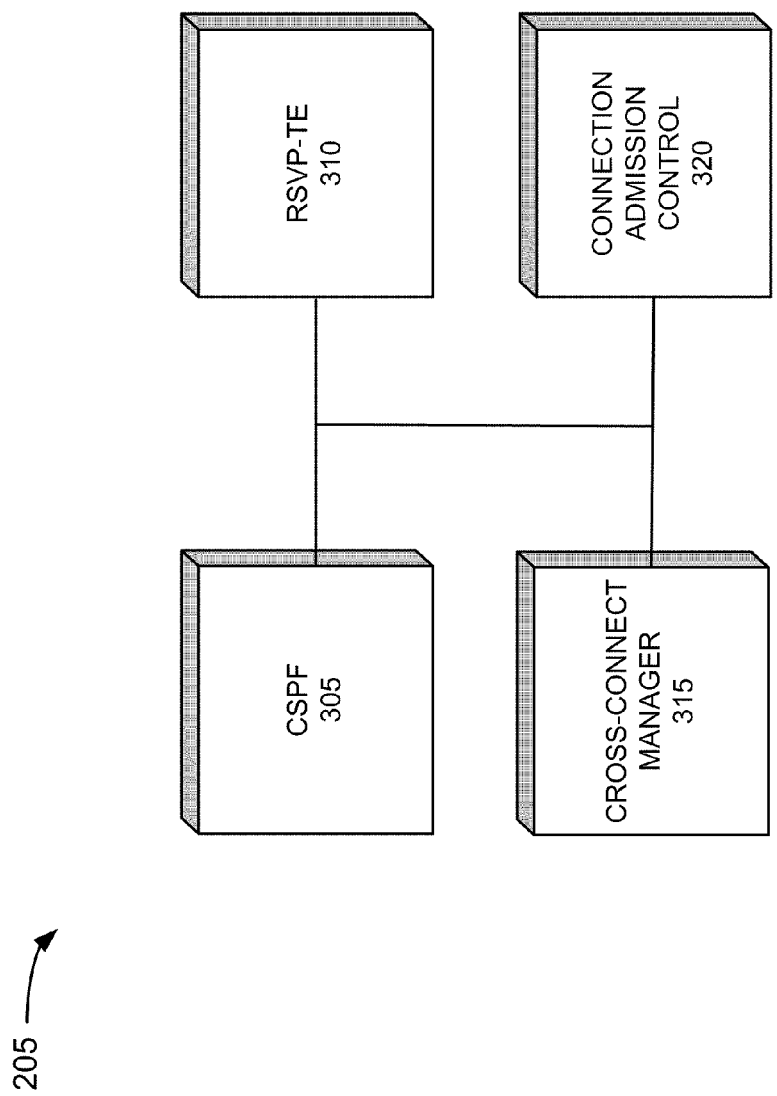

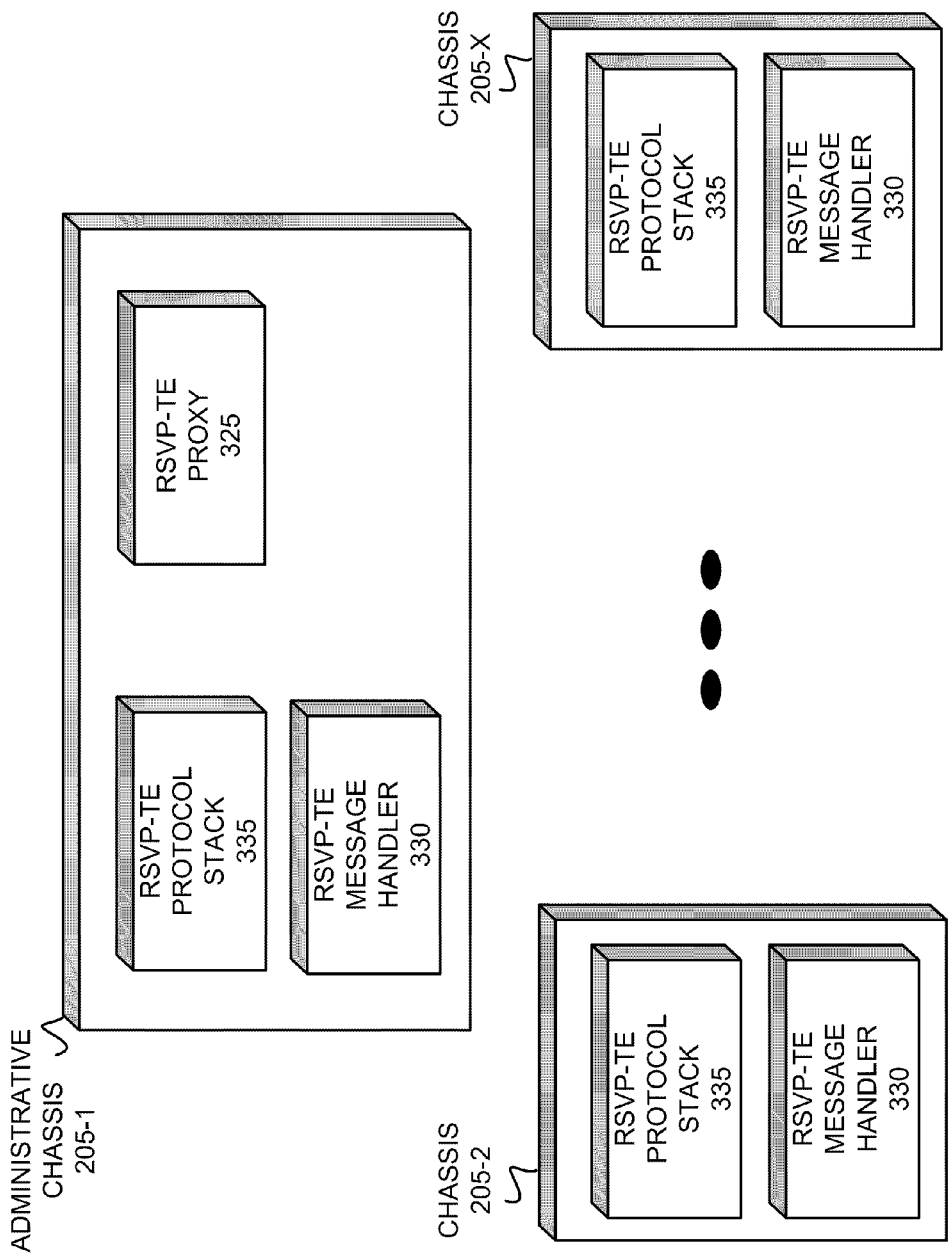

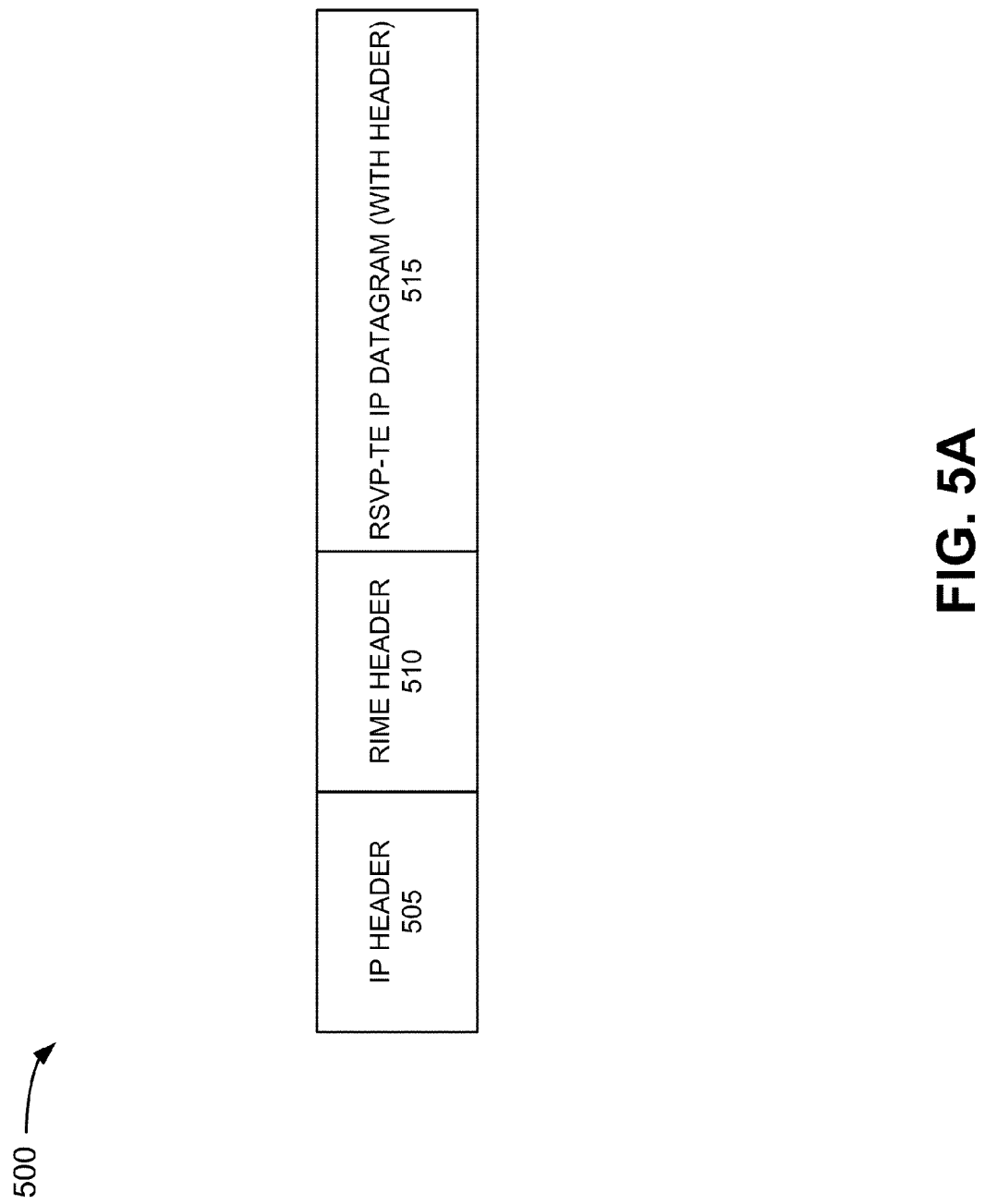

| VERSION 520 | FLAGS 525 | MESSAGE TYPE 530 | MESSAGE ACTION 535 |
|---|---|---|---|
| {RIME HEADER 510} | | | |
| INCOMING INTERFACES 540 | | | |
| OUTGOING INTERFACES 545 | | | |
| LENGTH 550 | | | |
| RSVP-TE PROTOCOL MESSAGE (INCLUDING IP HEADER) 555 | | | |

FIG. 5B

DISTRIBUTED RSVP-TE IN A MULTI-CHASSIS NODE ARCHITECTURE

BACKGROUND

Multi-chassis node architecture is increasingly becoming a de facto deployment option for core optical network elements (e.g., optical routers or optical switches). This is mainly driven by the increase in need for high capacity network interfaces (e.g., Dense Wavelength Division Multiplexing (DWDM)) and the corresponding volume of routing and/or switching associated therewith.

Although a multi-chassis system includes multiple control processors, the Generalized Multiprotocol Label Switching (GMPLS) signaling protocol stack is typically designed in a centralized manner to avoid complexity and messaging overhead. However, under such a framework, a centralized GMPLS signaling architecture does not scale well because of the large number of Label Switched Path (LSP) tunnels and the bottlenecking that may occur.

SUMMARY

According to one implementation, a network device may include a first chassis, where the first chassis includes a first plurality of line cards and a first resource reservation protocol (RSVP) stack associated with network traffic carried by the first plurality of line cards, and a second chassis, where the second chassis includes a second plurality of line cards and a second RSVP stack associated with network traffic carried by the second plurality of line cards, where the first chassis may further include a proxy module. The proxy module may receive a first RSVP message, determine whether the first RSVP message corresponds to a node-oriented RSVP message or an interface-oriented RSVP message, and pass the first RSVP message to the second RSVP stack when it is determined that the first RSVP message is the interface-oriented RSVP message, and process the first RSVP message when it is determined that the first RSVP message is the node-oriented RSVP message.

According to another implementation, a network device may include a first chassis, where the first chassis includes a first reservation resource protocol (RSVP) stack associated with network traffic, and a second chassis, where the second chassis includes a second RSVP stack associated with network traffic. The first chassis may further include a proxy module, where the proxy module is to receive all RSVP messages from another network device that are bound to the first RSVP stack or bound to the second RSVP stack, and transmit all RSVP messages to the other network device from the first RSVP stack and from the second RSVP stack. The second chassis may further include a second message handler, where the second message handler is to encapsulate each RSVP message to be transmitted via the proxy module, with an additional header that includes a field that specifies one of to forward the RSVP message, to process the RSVP message, or to reroute the RSVP message, and where the proxy module is further to de-encapsulate the additional header from each RSVP message received from the second message handler.

According to yet another implementation, a method performed by a network device, may include receiving a first resource reservation protocol (RSVP) message by a first chassis having a first RSVP stack; determining, by the first chassis, whether the first RSVP message is a node-oriented RSVP message or an interface-oriented RSVP message; and encapsulating, by the first chassis, the first RSVP message with an additional header, when it is determined that the first RSVP message is the interface-oriented RSVP message. The method may further include forwarding, by the first chassis, the encapsulated first RSVP message to a second chassis having a second RSVP stack; and processing, by the first chassis, the first RSVP message, when it is determined that the first RSVP message is the node-oriented RSVP message.

According to still another implementation, a device may include multiple chassis to provide routing or switching services, the multiple chassis including an administrative chassis and one or more shelf chassis, each chassis of the multiple chassis may include a resource reservation protocol (RSVP) stack to provide resource reservation services to network links handled by the chassis, and a unique network address. The administrative chassis may receive and transmit node-oriented RSVP messages from and to other devices, and the one or more shelf chassis may receive and transmit interface-oriented RSVP messages from and to other devices.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3A is a diagram of exemplary functional components of a chassis of FIG. 2A;

FIG. 4 is a diagram of an exemplary distributed RSVP-TE arrangement in a multi-chassis node;

FIG. 5A is a diagram of an RSVP-TE Internet Protocol (IP)-in-IP message encapsulation (RIME);

FIG. 5B is a diagram of an exemplary RIME header of FIG. 5A;

DETAILED DESCRIPTION

The following detailed description refers to the accompanying drawings. The same reference numbers in different drawings may identify the same or similar elements.

Implementations, described herein, may provide an architecture that distributes the Resource Reservation Protocol-Traffic Engineering (RSVP-TE) across multiple chassis of a node. In one implementation, the architecture may include an administrative chassis (e.g., a node controller) and one or more other chassis. In another implementation, the architecture may only include the administrative chassis. Each chassis may include an RSVP-TE protocol stack that may provide RSVP-TE services for label switching path (LSP) tunnels pertaining to the chassis. The administrative chassis may provide a node view of the distributed RSVP-TE protocol stacks and may facilitate adjacency mechanisms with respect to neighboring nodes, as well as failure detection/recovery mechanisms. As a result, distributed RSVP-TE stacks residing in a multi-chassis node, may, among other things, minimize scalability issues and improve performance when high-capacity routing and/or switching services are needed.

In this description, reference to node-oriented RSVP-TE messages may include, for example, HELLO messages, acknowledgement (ACK) messages, Summary Refresh (SRefresh) messages, Notify messages, and Reservation-Confirmation messages. Similar, in this description, reference to interface-oriented RSVP-TE messages may include, for example, Path messages, Path-error messages, Path-tear messages, Reservation messages, Reservation error messages, Reservation-tear messages, and Recovery-path messages. In other implementations, RSVP-TE node-oriented messages and/or interface-oriented messages may include different types of messages. Additionally, or alternatively, in other implementations, the categorization of node-oriented and interface-oriented messages may be omitted.

Exemplary Network

Figure 1:
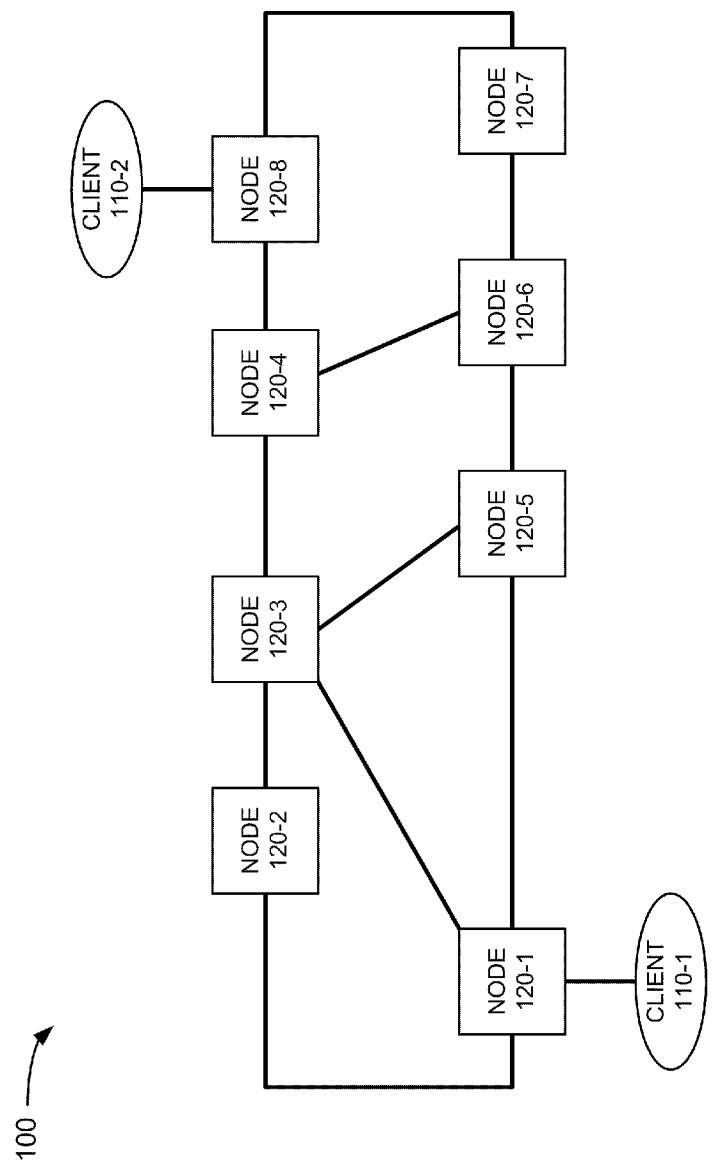
FIG. 1 is a diagram of an exemplary network in which devices, systems and/or methods described herein may be implemented.

FIG. 1 is a diagram of an exemplary network 100 in which systems, devices, and/or methods, described herein, may be implemented. For example, network 100 may include clients 110-1 and 110-2 (referred to collectively as "clients 110," and individually as "client 110") and nodes 120-1, . . . , 120-8 (referred to collectively as "nodes 120," and individually as "node 120"). While FIG. 1 illustrates a particular number and arrangement of clients 110 and nodes 120, network 100 may include additional, fewer, different, and/or differently arranged clients 110 and/or nodes 120 than those illustrated in FIG. 1. Also, the connections between clients 110 and/or nodes 120 may include direct and/or indirect connections.

Client 110 may include any type of network device, such as a router, a switch, or a central office, that may transmit data traffic. In one implementation, client 110 may transmit a client signal (e.g., a synchronous optical network (SONET) signal, a synchronous digital hierarchy (SDH) signal, an Ethernet signal, or another type of signal) to node 120. The client signal may conform to any payload type, such as, for example, Gigabit Ethernet (GbE), 2xGbE, Fibre Channel (FC), 1GFC, 10GbE LAN Phy, 10GbE WAN Phy, Synchronous Transport Mode 16 (STM-16), STM-64, Optical Carrier level 48 (OC-48), Optical Transport Network (OTN) (e.g., that supports Optical Transport Unit (OTUk) (k=0 . . . 4), and OC-192.

Node 120 may include a dense wavelength division multiplexing (DWDM) device that performs routing or switching functions. Node 120 may include a multi-chassis device. Node 120 may perform optical multiplexing operations (e.g., receive individual client signals on individual optical links and generate a multi-wavelength signal that may be transmitted on a single optical link), optical amplification operations (e.g., amplify the multi-wavelength signal), optical add-drop multiplexing operations (e.g., remove one or more client signals from the multi-wavelength signal), and/or optical demultiplexing operations (e.g., receive the multi-wavelength signal and separate the multi-wavelength signal back into individual client signals that may be transmitted on individual optical links). To perform these operations, node 120 may contain various components, such as an optical multiplexer (to perform the optical multiplexing operations), an optical amplifier (to perform the optical amplification operations), an optical add-drop multiplexer (e.g., a remotely configurable add/drop multiplexer (ROADM)) (to perform the optical add-drop multiplexing operations), and/or an optical demultiplexer (to perform the optical demultiplexing operations).

Nodes 120 may be connected via optical links. Data traffic may flow from node-to-node over a series of optical links. Any two nodes 120 may connect via multiple optical links. For bidirectional communication, for example, an optical link (commonly referred to as a "working link") may be dedicated for data traffic transmitted in one direction, another optical link (also commonly referred to as a "working link") may be dedicated for data traffic transmitted in the opposite direction, and yet another optical link (commonly referred to as a "protection link") may be used in case of a failure on a working link. In practice, there may be N working links and M protection links between two nodes 120, where M≤N.

Exemplary Node Components

Figure 2A:
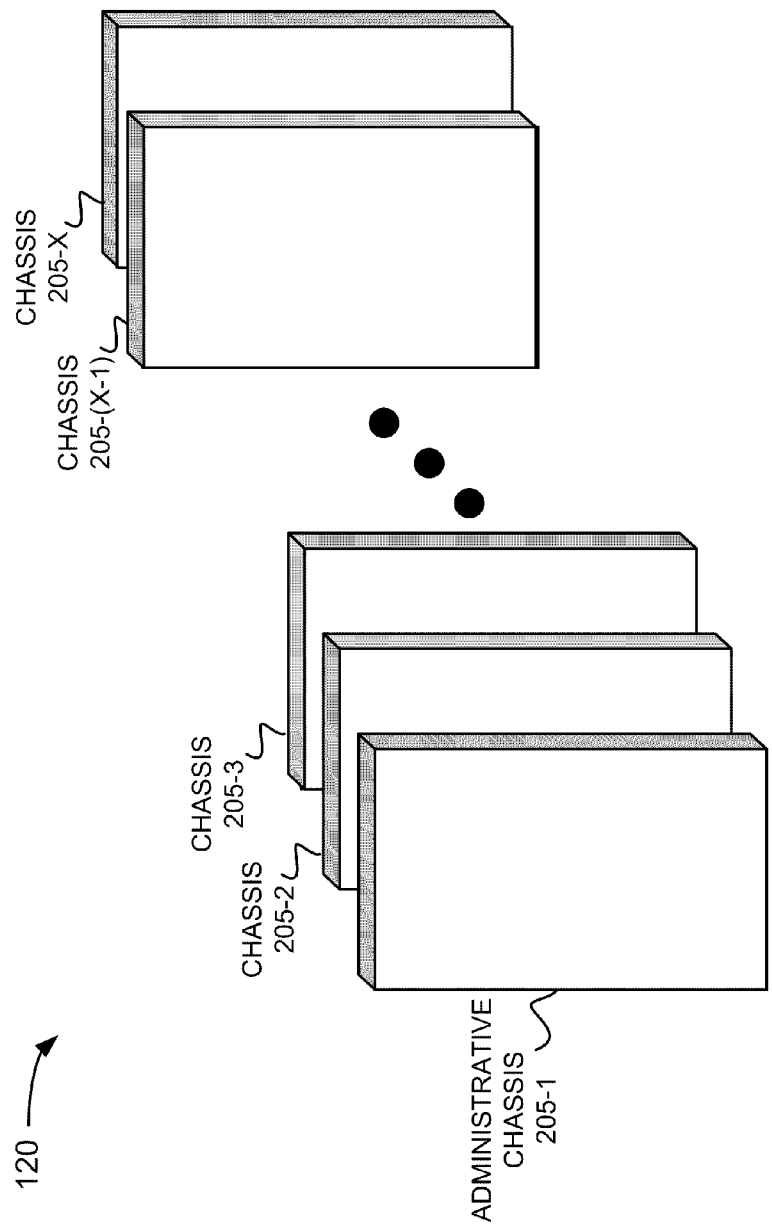
FIG. 2A is a diagram of an exemplary multi-chassis arrangement for a node of FIG. 1.

In one implementation, node 120 may correspond to a multi-chassis device. FIG. 2A is a diagram of exemplary components of an exemplary node 120. As illustrated in FIG. 2A, node 120 may include chassis 205-1, 205-2, . . . , 205-X (referred to generally as "chassis 205") (where X>1).

Chassis 205 may include hardware components, or a combination of hardware and software components, that may perform routing and/or switching operations. In one embodiment, one of chassis 205 (e.g., chassis 205-1) may correspond to an administrative chassis 205-1 (referred to generally as administrative chassis 205). Administrative chassis 205 may permit network administrators to configure node 120. Administrative chassis 205 may operate as a controller of node 120.

Figure 2B:
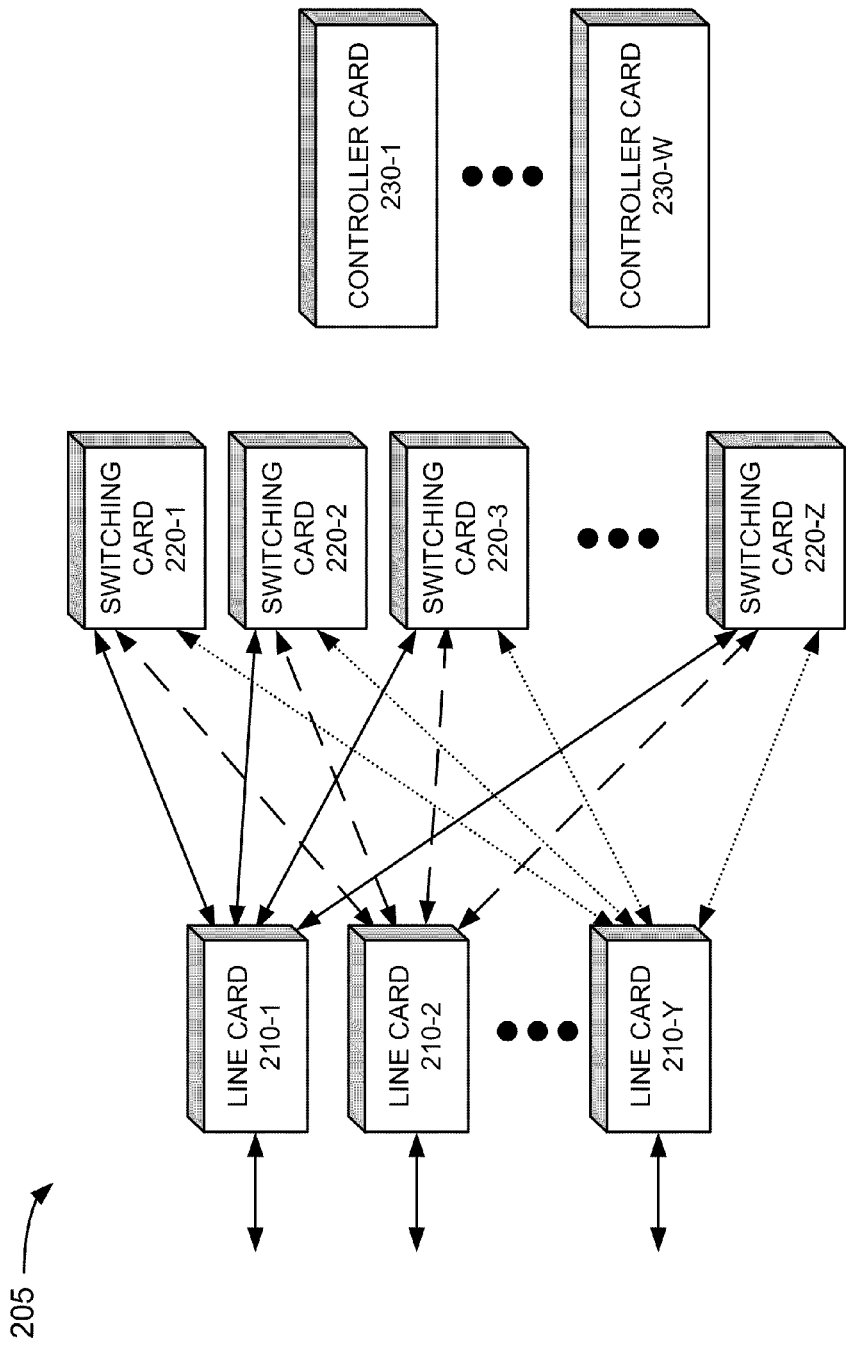
FIG. 2B is a diagram of exemplary components of a chassis of FIG. 2A.

FIG. 2B is a diagram of exemplary components of chassis 205. As shown in FIG. 2B, chassis 205 may include line cards 210-1, 210-2, . . . , 210-Y (referred to collectively as "line cards 210," and generally as "line card 210") (where Y≥1) connected to switching cards 220-1, 220-2, . . . 220-Z (referred to collectively as "switching cards 220," and generally as "switching card 220") (where Z≥1), and controller cards 230-1, . . . 230-W (referred to collectively as "controller cards 230," and generally as "controller card 230") (where W≥1). While FIG. 2B illustrates a particular number and arrangement of components, chassis 205 may include additional, fewer, different, and/or differently arranged components than those illustrated in FIG. 2B and described herein. For example, chassis 205 may also include one or more tributary modules that may support flexible adding-dropping of multiple services, such as SONET/SDH services, GbE services, optical transport network (OTN) services, and FC services. Also, it may be possible for one of the components of chassis 205 to perform a function that is described as being performed by another one of the components.

Line card 210 may include hardware components, or a combination of hardware and software components, that may provide network interface operations. Line card 210 may receive a multi-wavelength optical signal and/or transmit a multi-wavelength optical signal. A multi-wavelength optical signal may include a number of optical signals of different optical wavelengths. In one implementation, line card 210 may perform retiming, reshaping, regeneration, time division multiplexing, and/or recoding services for each optical wavelength. Line card 210 may include one or more tributary modules (e.g., line card 210 toward a client device), while in other instances, line card 210 may not include a tributary module (e.g., line card 210 toward another node 120). Line card 210 may be associated with, for example, a TE interface or node-level interface, and/or an interface or a shelf-level interface.

Switching card 220 may include hardware components, or a combination of hardware and software components, that may provide switching functions to transfer data between line cards 210. Switching card 220 may be programmed to transfer data from a particular input to a particular output.

As illustrated in FIG. 2B, each of line cards 210 may connect to each of switching cards 220. The connections between line cards 210 and switching cards 220 may be bidirectional. While a single connection is shown between a particular line card 210 and a particular switching card 220, the connection may include a pair of unidirectional connections (i.e., one in each direction).

Controller card 230 may include hardware components, or a combination of hardware and software components, that may control line cards 210, switching cards 220 and/or tributary modules. For example, controller card 230 may manage resources between line cards 210. Line cards 210 may interface towards clients 110, while other line cards 210 may interface towards other nodes 120.

Figure 2C:
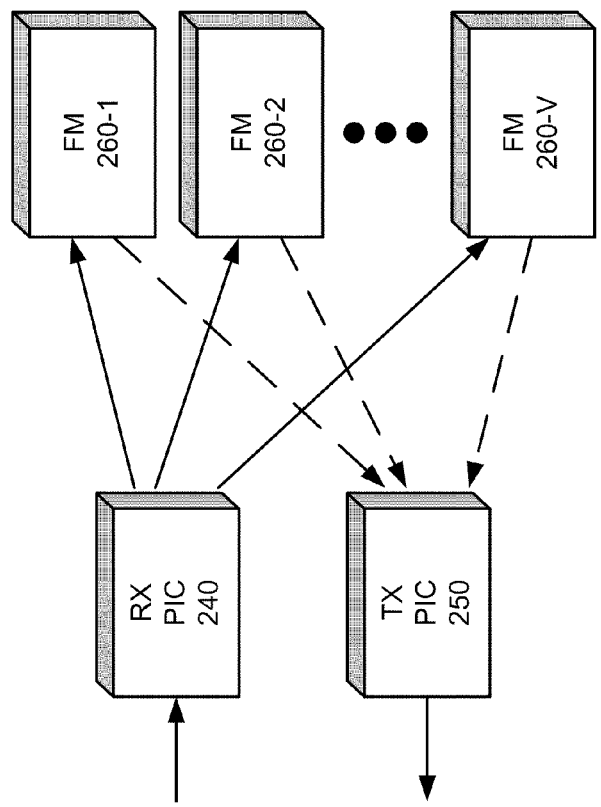
FIG. 2C is a diagram of exemplary components of a line card of FIG. 2B.

FIG. 2C is a diagram of exemplary components of a line card 210. As shown in FIG. 2C, line card 210 may include a receiver (RX) photonic integrated circuit (PIC) 240, a transmitter (TX) PIC 250, and fabric managers (FMs) 260-1, 260-2, ..., 260-V (referred to collectively as "FMs 260," and individually as "FM 260") (where V≥1). While FIG. 2C illustrates a particular number and arrangement of components, line card 210 may include additional, fewer, different, or differently arranged components than those illustrated in FIG. 2C and described herein. Also, it may be possible for one of the components of line card 210 to perform a function that is described as being performed by another one of the components.

Receiver PIC 240 may include hardware components, or a combination of hardware and software, that may receive a multi-wavelength optical signal, separate the multi-wavelength signal into signals of individual wavelengths, and convert the signals to digital form. In one implementation, receiver PIC 240 may include components, such as a photodetector, a demultiplexer, and/or an optical-to-electrical converter. Transmitter PIC 250 may include hardware, or a combination of hardware and software, that may convert signals from digital form, combine the signals of the individual wavelengths into a multi-wavelength signal, and transmit the multi-wavelength signal. In one implementation, transmitter PIC 250 may include components, such as an electrical-to-optical converter, a multiplexer, and/or a laser. As illustrated in FIG. 2C, receiver PIC 240 and transmitter PIC 250 may connect to each of FMs 260. Receiver PIC 240 may transfer data to FMs 260. Transmitter PIC 250 may receive data from FMs 260.

FM 260 may include hardware components, or a combination of hardware and software, that may process digital signals for transmission to switching card 220 or transmitter PIC 250. In one implementation, FM 260 may receive a stream of data from receiver PIC 240 and divide the stream into chunks of continuous bytes, called "timeslots," associated with particular channels (e.g., a channel may refer to a communication between a particular source and a particular destination). In one implementation, each timeslot may include the same quantity of bytes (e.g., each timeslot may contain an equal amount of bandwidth). In another implementation, each timeslot may not include the same quantity of bytes (e.g., at least one timeslot may contain a different amount of bandwidth). The stream of data received by FM 260 may, in one implementation, already be segmented into timeslots. In this situation, when dividing the stream into timeslots, FM 260 may identify the timeslots based on, for examples, identifiers in the stream.

FIG. 3A is a diagram of exemplary functional components of chassis 205. As illustrated, chassis 205 may include a constrained shortest path first (CSPF) module 305, a RSVP-TE module 310, a cross-connect manager module 315, and a connection admission control (CAC) module 320. In one implementation, CSPF module 305, RSVP-TE module 310, cross-connect manager module 315, and/or CAC module 320 may correspond to functional components associated with a GMPLS signaling subsystem of chassis 205. While FIG. 3A illustrates a particular number and arrangement of functional components, chassis 205 may include additional, fewer, different, and/or differently arranged components than those illustrated in FIG. 3A and described herein. Also, it may be possible for one of the components of chassis 205 to perform a function that is described as being performed by another one of the components.

CSPF module 305 may include hardware components, or a combination of hardware and software components, that may provide the CSPF algorithm to compute the shortest path based on a set of constraints.

RSVP-TE module 310 may include hardware components, or a combination of hardware and software components, that may provide the RSVP-TE to reserve resources across a network (e.g., network 100). RSVP-TE module 310 may provide setup and teardown of resources for multicast and unicast data flows. RSVP-TE module 310 may permit the establishment of GMPLS label switched paths (LSPs).

Cross-connect manager module 315 may include hardware components, or a combination of hardware and software components, that may commit labels associated with LSPs to components (e.g., line cards 210) of chassis 205. Cross-connect manager 315 may program and/or configure switching cards 220.

CAC module 320 may include hardware components, or a combination of hardware and software components, that may manage and/or regulate the bandwidth in a network (e.g., network 100). CAC module 320 may manage whether an LSP may be admitted and may reserve bandwidth for the admitted LSP.

Figure 3B:
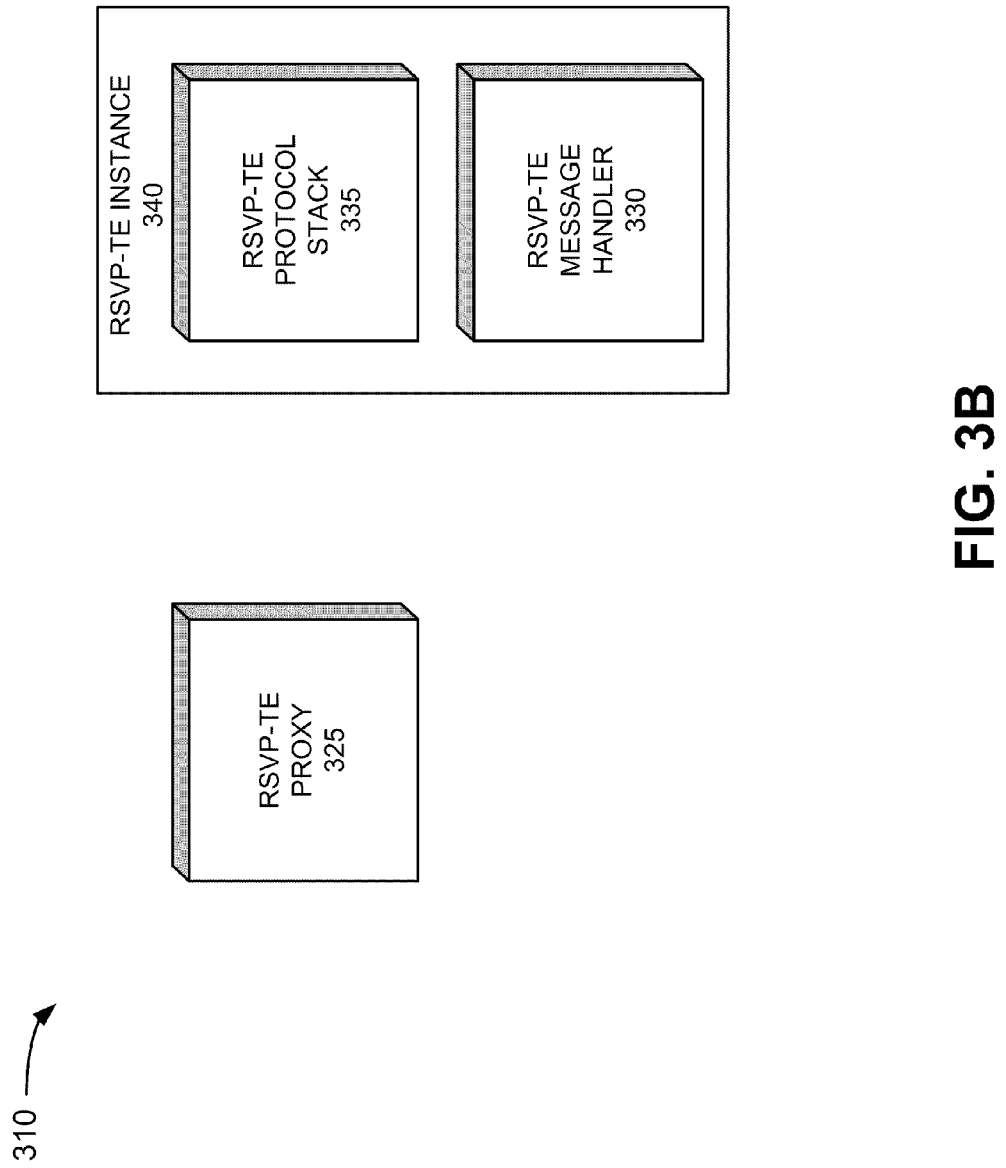
FIG. 3B is a diagram of exemplary functional components of a Resource Reservation Protocol-Traffic Engineering (RSVP-TE) module of FIG. 3A.

FIG. 3B is a diagram illustrating exemplary functional components of RSVP-TE module 310. As illustrated, RSVP-TE module 310 may include a RSVP-TE proxy module 325, a RSVP-TE message handler module 330, and an RSVP-TE protocol stack 335. While FIG. 3B illustrates a particular number and arrangement of functional components, RSVP- TE module 310 may include additional, fewer, different, and/or differently arranged components than those illustrated in FIG. 3B and described herein. Also, it may be possible for one of the components of RSVP-TE module 310 to perform a function that is described as being performed by another one of the components.

RSVP-TE proxy module 325 may include hardware components, or a combination of hardware and software components, that may provide various functions associated with the RSVP-TE, such as, for example, neighbor management (e.g., HELLO messages), SRefresh messages, state recovery management, and internal message forwarding between the distributed architecture of the RSVP-TE of chassis 205.

RSVP-TE message handler module 330 may include hardware components, or a combination of hardware and software components, that may manage the sending and the receiving of RSVP-TE messages. RSVP-TE message handler module 330 may be a proxy-aware component that coordinates with RSVP-TE proxy module 325. RSVP-TE message handler module 330 may encapsulate and de-encapsulate RSVP-TE messages, as will be described further below.

RSVP-TE protocol stack 335 may correspond to a standard RSVP-TE protocol stack. In this description, RSVP-TE message handler module 330 and RSVP-TE protocol stack 335 may be referred to collectively as an RSVP-TE instance 340.

FIG. 4 is a diagram of an exemplary arrangement of RSVP-TE proxy module 325, RSVP-TE message handler module 330, and RSVP-TE protocol stack 335 with respect to chassis 205. As illustrated in FIG. 4, administrative chassis 205 may include RSVP-TE proxy module 325, RSVP-TE message handler module 330, and RSVP-TE protocol stack 335, while other chassis 205 may only include RSVP-TE message handler module 330 and RSVP-TE protocol stack 335 (i.e., RSVP-TE instances 340).

Under this framework, RSVP-TE proxy module 325 may manage node-level RSVP-TE protocol stack consolidation with respect to RSVP-TE neighbors (i.e., neighbor nodes 120). For example, neighbor RSVP-TE instances may correspond to RSVP-TE message handlers 330 and RSVP-TE protocol stacks 335 (e.g., a Data Connection Limited (DCL) RSVP-TE stack) that may be running on other nodes 120. Additionally, RSVP-TE proxy module 325 may emulate as an RSVP-TE neighbor with respect to RSVP-TE instances 340 associated with chassis 205-2 through 205-X.

RSVP-TE proxy module 325 may be assigned a unique local address (e.g., an Internet Protocol (IP) address). For example, RSVP-TE proxy module 325 may be assigned an RSVP-TE Proxy IP address (e.g., 127.1.1.100). Alternatively, RSVP-TE proxy module 325 may be assigned an address that corresponds to an identifier (ID) of node 120 (e.g., a router ID or a switch ID). Each RSVP-TE instance 340 may be assigned an internal address (e.g., a Shelf-IP address). The internal address may be utilized for internal communications (e.g., between RSVP-TE instance 340 and RSVP-TE proxy module 325, or between RSVP-TE instances 340), while communications external to node 120, node's 120 router ID or switch ID may be utilized.

RSVP-TE proxy module 325 may listen to raw IP sockets for external unicast RSVP-TE messages. RSVP-TE proxy module 325 may listen to customized RSVP-TE IP-in-IP Message Encapsulation (RIME) messages from RSVP-TE Message Handlers 325 associated with chassis 205-1 through 205-X. RIME messages will be described in greater detail below. RSVP-TE proxy module 325 may provide for HELLO messages with respect to RSVP-TE neighbors (i.e., other nodes 120) on behalf of RSVP-TE protocol stacks 335 associated with chassis 205-2 through 205-X. RSVP-TE proxy module 325 may facilitate local chassis/node recovery processes and/or restart processes.

RSVP-TE proxy module 325 may perform message forwarding (e.g., RSVP-TE messages) between distributed RSVP-TE instances 340 and neighbor RSVP-TE instances (i.e., RSVP-TE instances associated with other nodes 120). In one embodiment, RSVP-TE proxy module 325 may maintain, for example, look-up tables for forwarding RSVP-TE messages. The look-up tables may include, for example, a session look-up table and a message-ID look-up table. RSVP-TE instances 340 may synchronize RSVP-TE messages with RSVP-TE proxy 330.

The session look-up table may include information with respect to sessions. For example, an exemplary session look-up table entry may include an egress address, an extended tunnel ID, a tunnel ID, and an LSP ID that may be mapped to a RSVP-TE instance 340. The message-ID look-up table may include an identifier for RSVP-TE messages. For example, an exemplary message-ID look-up table entry may include a neighbor message ID that may be mapped to a RSVP-TE instance 340.

RSVP-TE message handler module 330 may have access to a socket layer of RSVP-TE protocol stack 335. RSVP-TE message handler module 330 may intercept RSVP-TE messages sent by RSVP-TE protocol stack 335 and may implement forwarding rules for a given RSVP-TE message type. RSVP-TE message handler module 330 may listen to raw IP sockets bound to RSVP-TE message handler module 330 from RSVP-TE proxy 325 or other RSVP-TE message handlers 330. For example, RSVP-TE message handler module 330 may listen to RIME messages from RSVP-TE proxy 325 to RSVP-TE protocol stack 335.

RSVP-TE message handler module 330 may run a HELLO protocol, on behalf of neighbor RSVP-TE instances, with respect to its local RSVP-TE protocol stack 335, using neighbor RSVP-TE instance states that may be updated by RSVP-TE proxy module 325. In turn, RSVP-TE message handler module 330 may update its local RSVP-TE protocol stack 335 running on a particular chassis 205.

RSVP-TE message handler module 330 may perform message forwarding (e.g., RSVP-TE messages) between RSVP-TE protocol stack 335 and neighbor RSVP-TE instances (i.e., RSVP-TE instances associated with other nodes 120).

In one embodiment, RSVP-TE message handler module 330 may maintain, for example, look-up tables for forwarding RSVP-TE messages. For example, the look-up tables may include a local session look-up table and a forwarding session look-up table. The local session look-up table may include information with respect to sessions. For example, an exemplary local session look-up table entry may include an egress IP address, an extended tunnel ID, a tunnel ID, and/or an LSP ID. The forwarding session look-up table may include an egress IP address, an extended tunnel ID, a tunnel ID, and/or an LSP ID that is mapped to a RSVP-TE instance 340.

Each RSVP-TE message handler module 330 may be assigned a unique local address (e.g., an Internet Protocol (IP) address). For example, RSVP-TE message handler module 330 may be assigned an IP address that includes an ID associated with the corresponding chassis 205 (e.g., 127.<chassis-id>.1.101). Alternatively, RSVP-TE message handler module 330 may be assigned an internal shelf address (e.g., a shelf IP address).

Exemplary RIME Message

As previously described, RIME messages may be exchanged between RSVP-TE proxy module 325 and RSVP- TE message handlers 330 within node 120. FIGS. 5A and 5B are diagrams illustrating an exemplary RSVP-TE message encapsulation. As illustrated, RIME message 500 may include an IP header 505, a RIME header 510, and an RSVP-TE IP datagram 515. RIME message 500 may allow communication between RSVP-TE proxy module 325 and RSVP-TE message handlers 330. RIME message 500 includes encapsulation over an IP datagram. In one embodiment, RIME message 500 may not be exchanged between nodes 120, but only between chassis 205 of node 120. RIME messages 500 may provide for communication between RSVP-TE modules 310 and/or chassis 205.

IP header 505 may include an internal source IP address and an internal destination IP address. These IP addresses may relate to RSVP-TE module 310, RSVP-TE proxy module 325, and/or RSVP-TE message handler module 330 corresponding to chassis 205, and may be unique. IP header 505 may include other information, such as, for example, a transport protocol identifier (e.g., 200) and a time-to-live field.

RIME header 510 may include header information that includes, among other things, RSVP-TE message type and interface information. RIME header 510 is described in greater detail with respect to FIG. 5B. RSVP-TE IP Datagram 515 may include RSVP-TE payload information. RSVP-TE IP datagram 515 may also include a header (e.g., an IP header).

FIG. 5B is a diagram illustrating an exemplary RIME header. As illustrated, RIME header 510 may include the following fields: version 520, flags 525, message type 530, message action 535, incoming interfaces 540, outgoing interfaces 545, length 550, and RSVP-TE protocol message 555.

Version 520 may include RIME message version information. Flags 525 may be used for future use. Message type 530 may include information that indicates the RSVP-TE message type carried in RIME message 500. The RSVP-TE provides for various message types, such as, for example, HELLO message, Path message, Path-error message, Path-tear message, Reservation message, Reservation-error message, Reservation-tear message, Acknowledgement message, Notify message, Reservation confirmation message, and Recovery-path message.

Message action 535 may include information that indicates the action(s) to be taken by a receiving entity of RIME message 500. These actions may include, for example, undefined, forward, process, or reroute. For example, when the action corresponds to a forward action, the receiving entity (e.g., RSVP-TE message handler modules 330) of RIME message 500 may forward RIME message 500 on the specified outgoing interfaces 545 using a multicast socket. In the event that outgoing interfaces 545 is not specified, RIME message 500 may be forwarded using a unicast socket. When the message action corresponds to a process action, the receiving entity may process RIME message 500. When the message action corresponds to a reroute action, the receiving entity may forward RIME message 500 to the appropriate RSVP-TE message handler module 330 based on available look-up information. Incoming and/or outgoing interfaces may be specified.

Incoming interfaces 540 may include information that indicates an interface (e.g., associated with line card 210) from which RIME message 500 was originally received. Outgoing interfaces 545 may include information that indicates an interface (e.g., associated with line card 210) from which RIME message 500 needs to be transmitted.

Length 550 may include information that indicates the length of the RSVP-TE, IP encapsulated message, included in RIME message 500. RSVP-TE protocol message 555 may include the RSVP-TE message.

RSVP-TE Messages

Node 120 may manage the transmitting and receiving of RSVP-TE messages to/from other nodes 120, and may manage the transmitting and receiving of RSVP-TE messages within node 120, under two different schemes. The first scheme may correspond to a centralized fashion in which all RSVP-TE messages may be funneled through RSVP-TE proxy module 325. For example, node-oriented RSVP-TE messages and interface-oriented RSVP-TE messages, whether incoming or outgoing, may be funneled through RSVP-TE proxy module 325. RSVP-TE proxy module 325 may forward incoming RSVP-TE messages to an appropriate RSVP-TE message handler module 330 associated with an appropriate chassis 205. Additionally, RSVP-TE proxy module 325 may receive outbound RSVP-TE messages (e.g., interface-oriented RSVP-TE messages), from RSVP-TE message handlers 330.

The second scheme may correspond to a distributed fashion in which some of the RSVP-TE messages may not be funneled through RSVP-TE proxy module 325. Rather, each RSVP-TE message handler module 330, associated with each chassis 205, may directly receive and transmit some RSVP-TE messages to and from external nodes 120. In one embodiment, the RSVP-TE messages that may be directly received and transmitted by RSVP-TE message handler module 330 may correspond to interface-oriented RSVP-TE messages. The remaining type of RSVP-TE messages (e.g., node-oriented RSVP-TE messages) may be funneled through RSVP-TE proxy module 325.

Figure 6:
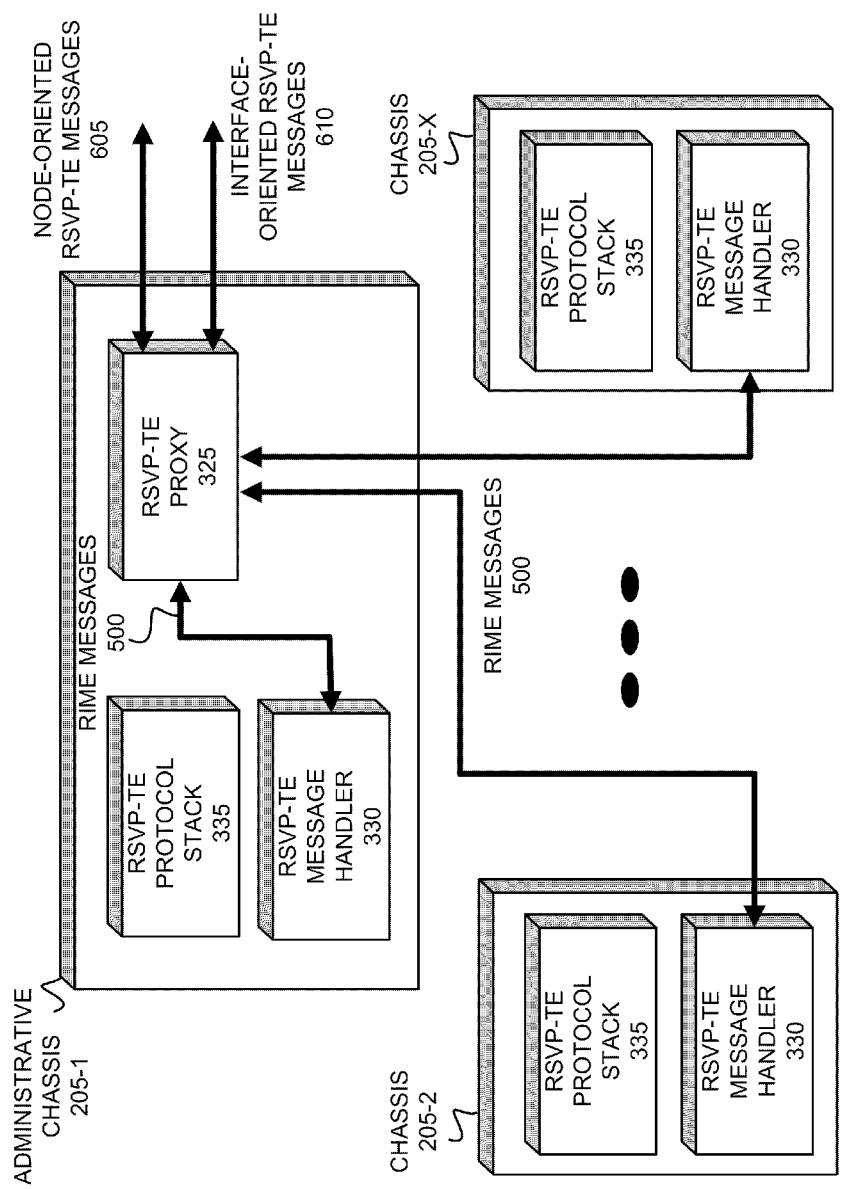
FIG. 6 is a diagram illustrating an exemplary arrangement for receiving and transmitting RSVP-TE messages in a centralized fashion.

FIG. 6 is a diagram illustrating an exemplary arrangement for receiving and transmitting RSVP-TE messages in a centralized fashion. In accordance with the centralized framework, node-oriented RSVP-TE messages 605 and interface-oriented RSVP-TE messages 610 may be funneled through RSVP-TE proxy module 325, whether incoming or outgoing.

RSVP-TE proxy module 325 may snoop the RSVP-TE multicast messages and the RSVP-TE unicast messages and may create an up-to-date forwarding or session table. Additionally, inter-chassis 205 control plane traffic and processing may be reduced since all RSVP-TE multicast and unicast messages are being funneled through RSVP-TE proxy module 325. Further, node 120 may be configured such that all interfaces may be terminated on administrative chassis 205 for switching and/or routing applications to function properly, in addition to which raw IP forwarding may be required when the outgoing interface, associated with an RSVP-TE message, does not have multicast capability. Thus, in such a configuration, administrative chassis 205 and RSVP-TE proxy module 325 may cooperatively manage the transmitting and receiving of RSVP-TE messages in an optimal way.

Figure 7A:
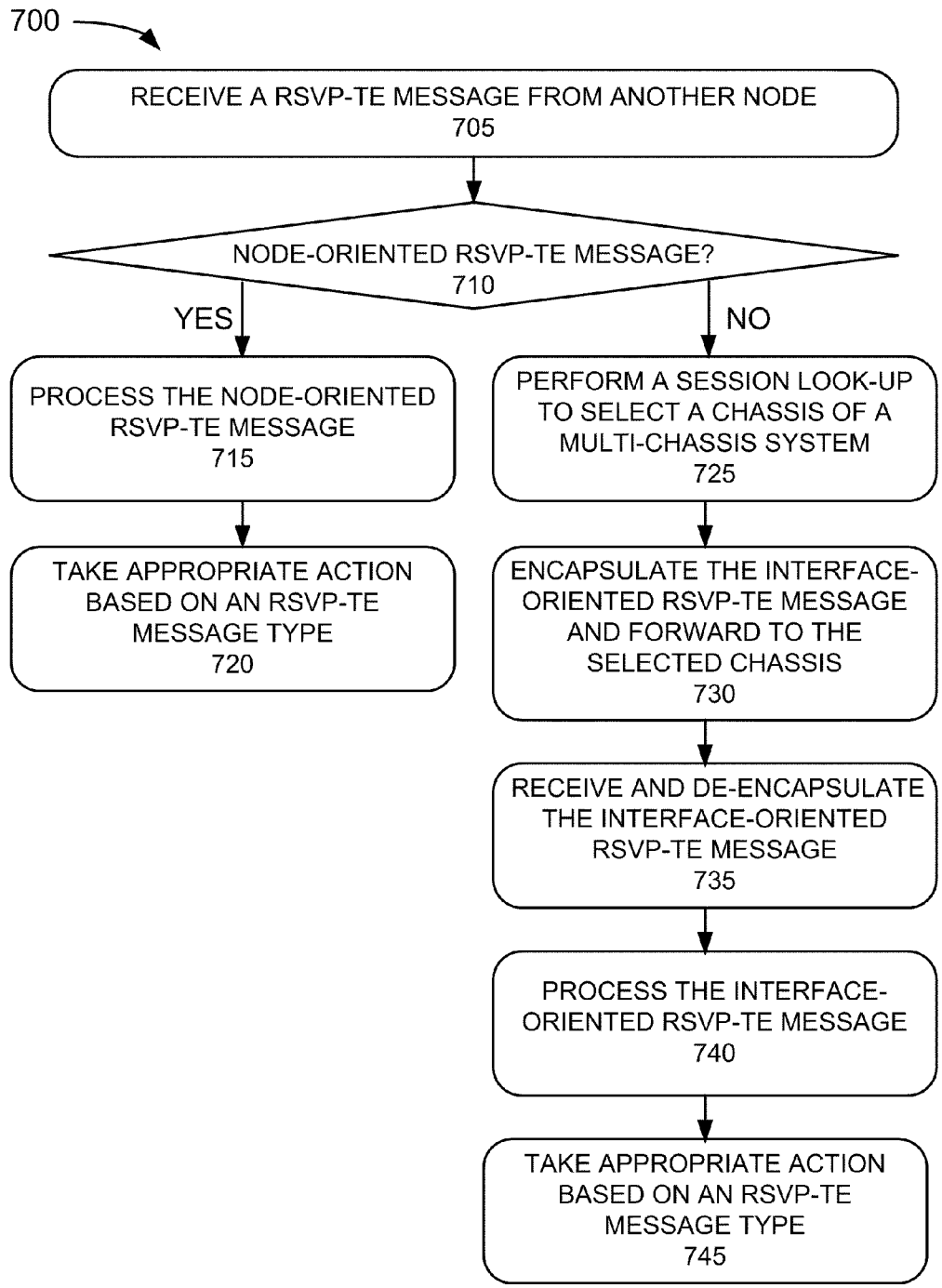
FIG. 7A is a flow diagram illustrating an exemplary process for receiving RSVP-TE messages in the centralized fashion.

FIG. 7A is a diagram of an exemplary process for receiving RSVP-TE messages in the centralized fashion.

Process 700 may begin with receiving an RSVP-TE message from another node (block 705). For example, RSVP-TE proxy module 325 may receive an RSVP-TE message from another node 120.

It may be determined whether the RSVP-TE message is a node-oriented RSVP-TE message (block 710). For example, RSVP-TE proxy module 325 may determine whether the received RSVP-TE message is a node-oriented RSVP-TE message or an interface-oriented RSVP-TE message. As previously described, in one implementation, node-oriented RSVP-TE messages may include, for example, HELLO messages, ACK messages, SRefresh messages, Notify messages, and Reservation-Confirmation messages, and interface-oriented RSVP-TE messages may include, for example, Path messages, Path-error messages, Path-tear messages, Reservation messages, Reservation error messages, Reservation-tear messages, and Recovery-path messages.

If it is determined that the RSVP-TE message is a node-oriented RSVP-TE message (block 710—YES), the node-oriented RSVP-TE message may be processed (block 715). For example, RSVP-TE proxy module 325 may process the node-oriented RSVP-TE message. The processing of the node-oriented RSVP-TE message may depend on the type of node-oriented RSVP-TE message (e.g., a HELLO message, an ACK message, etc.).

Appropriate action may be taken based on a message type (block 720). For example, RSVP-TE proxy module 325 may perform various operations based on the processing of the node-oriented RSVP-TE message. For example, these operations may relate to adjacency management, recovery management, etc., depending on the type of node-oriented RSVP-TE message.

If it is determined that the RSVP-TE message is not a node-oriented RSVP-TE message (block 710—NO), a session look-up may be performed to select a chassis of a multi-chassis system (block 725). For example, RSVP-TE proxy module 325 may perform a look-up in the session look-up table to select the appropriate chassis 205 (i.e., the RSVP-TE instance 340) to process the received interface-oriented RSVP-TE message. As previously described, in one implementation, the session look-up table may include a mapping of an RSVP-TE protocol stack 335 to session information (e.g., egress IP, extended tunnel ID, tunnel ID and/or LSP ID).

The interface-oriented RSVP-TE may be encapsulated based on the session look-up (block 730). For example, as previously described and illustrated with respect to FIGS. 5A and 5B, RSVP-TE proxy module 325 may encapsulate the received interface-oriented RSVP-TE message with IP header 505 and RIME header 510 to create a RIME message 500. IP header 505 may include, for example, a unique, local IP address that corresponds to the appropriate RSVP-TE message handler module 330 to which the received interface-oriented RSVP-TE message is destined. Additionally, RSVP-TE proxy module 325 may add RIME header 510 that includes, among other things, message type 530, message action 535, incoming interfaces 540, outgoing interfaces 545, and RSVP-TE protocol message (including IP header) 555. RSVP-TE proxy module 325 may forward the encapsulated, interface-oriented RSVP-TE message to the selected chassis 205 (i.e., the selected RSVP-TE instance 340).

The encapsulated, interface-oriented RSVP-TE message may be received and de-encapsulated (block 735). For example, RSVP-TE message handler module 330 may receive the encapsulated, interface-oriented RSVP-TE message and de-encapsulate the encapsulated, interface-oriented RSVP-TE message. RSVP-TE message handler module 330 may pass the de-encapsulated, interface-oriented RSVP-TE message to RSVP-TE protocol stack 335 for processing.

The interface-oriented RSVP-TE message may be processed (block 740). RSVP-TE protocol stack 335 may process the de-encapsulated, interface-oriented RSVP-TE message. The processing of the de-encapsulated, interface-oriented RSVP-TE message may depend on the type of interface-oriented RSVP-TE message (e.g., a Path message, a Path-error message, a Reservation message, etc.).

Appropriate action may be taken based on a message type (block 740). For example, RSVP-TE protocol stack 335 may perform various operations based on the processing of the interface-oriented RSVP-TE message. For example, these operations may relate to path setup, path teardown, reservation, etc.

Although FIG. 7A illustrates an exemplary process 700, in other implementations, fewer, additional, and/or different operations than those described, may be performed. For example, in other implementations, RSVP-TE node-oriented messages and/or RSVP-TE interface-oriented messages may include different types of messages.

Figure 7B:
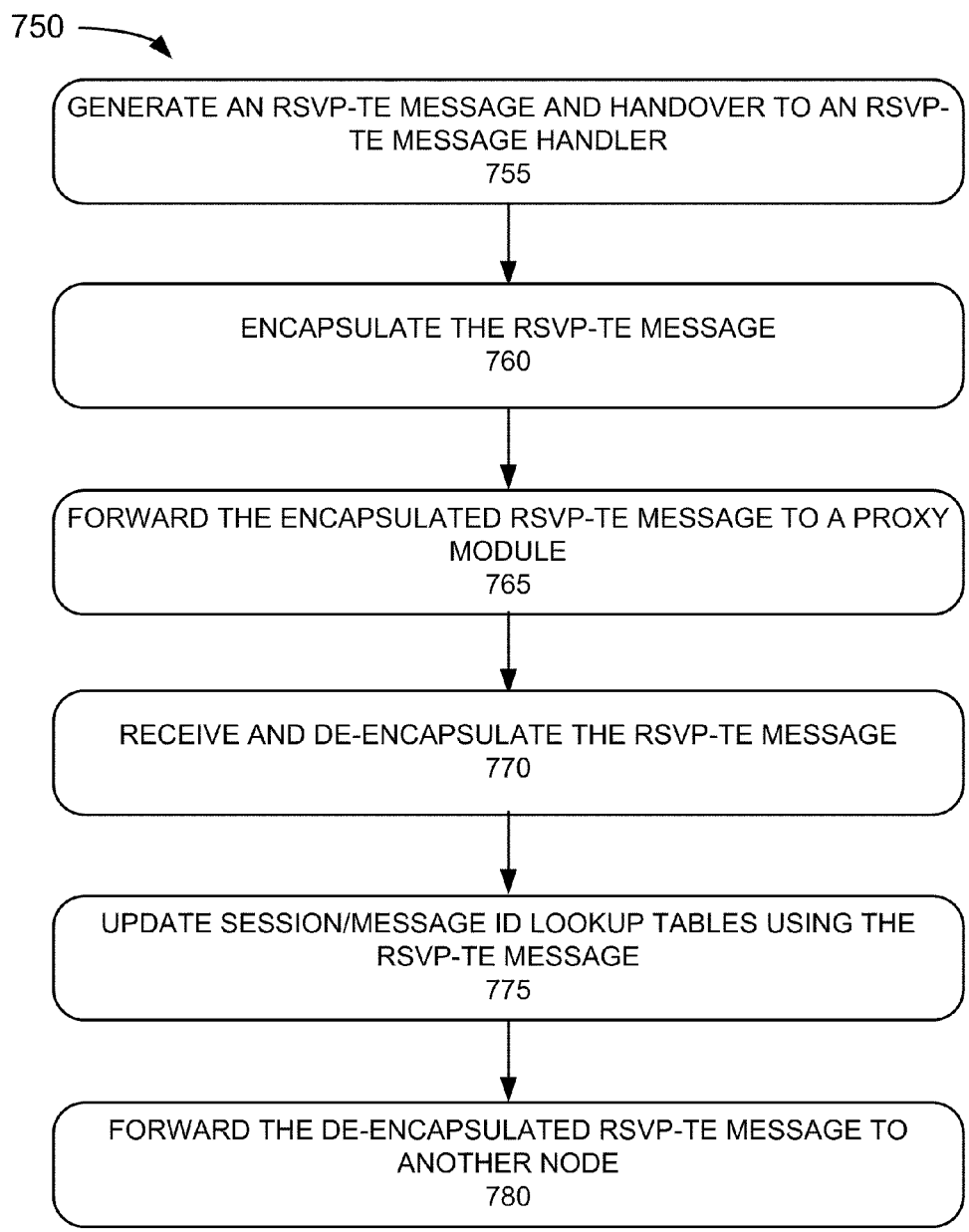
FIG. 7B is a flow diagram illustrating an exemplary process for transmitting RSVP-TE messages in the centralized fashion.

FIG. 7B is a flow diagram illustrating an exemplary process for transmitting RSVP-TE messages in the centralized fashion.

An RSVP-TE message may be generated on a chassis of a multi-chassis system (block 755). For example, RSVP-TE protocol stack 335 of a chassis (e.g., chassis 205-2) may generate an RSVP-TE message. RSVP-TE protocol stack 335 may pass the generated RSVP-TE message to RSVP-TE message handler module 330.

The RSVP-TE message may be encapsulated (block 760). For example, RSVP-TE message handler module 330 may encapsulate the RSVP-TE message into a RIME message 500, as previously described.

The encapsulated RSVP-TE message may be forwarded to a proxy module (block 765). For example, RSVP-TE message handler module 330 may forward the encapsulated RSVP-TE message to RSVP-TE proxy module 325.

The encapsulated RSVP-TE message may be received and de-encapsulated (block 770). For example, RSVP-TE proxy module 325 may receive the encapsulated RSVP-TE message and de-encapsulate the encapsulated RSVP-TE message.

Session and message ID lookup tables may be updated based on the RSVP-TE message (block 775). For example, RSVP-TE proxy module 325 may update session look-up table and/or message ID look-up table based on a content of the RSVP-TE message. For example, as previously described, the forwarding session look-up table may include an egress IP address, an extended tunnel ID, a tunnel ID, and/or an LSP ID that is mapped to an RSVP-TE protocol stack 335 (i.e., a local RSVP-TE instance).

The RSVP-TE message may be forwarded to another node (block 780). For example, RSVP-TE proxy module 325 may process and/or forward the RSVP-TE message to another node 120, in accordance with the information contained in the RSVP-TE message.

Although FIG. 7B illustrates an exemplary process 750, in other implementations, fewer, additional, and/or different operations than those described, may be performed. Additionally, although not illustrated in FIG. 7B, RSVP-TE message may be transmitted from RSVP-TE instance 340 associated with administrative chassis 205. RSVP-TE proxy module 325 may process and/or forward the RSVP-TE message to another node 120, in accordance with the information contained in the RSVP-TE message.

Figure 8:
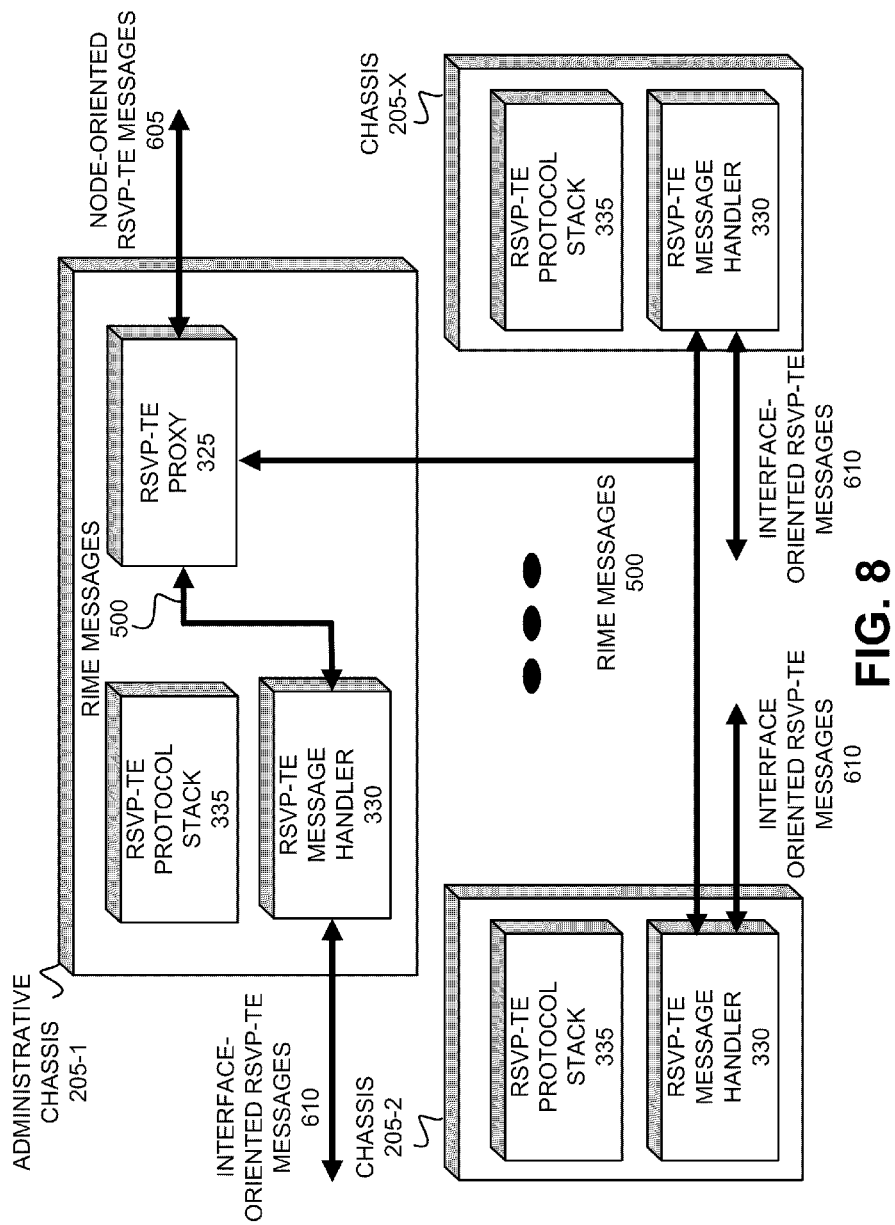
FIG. 8 is a diagram illustrating an exemplary arrangement for receiving and transmitting RSVP-TE messages in a distributed fashion.

FIG. 8 is a diagram illustrating an exemplary arrangement for transmitting and receiving RSVP-TE messages in a distributed fashion. In accordance with the distributed framework, node-oriented RSVP-TE messages 605 may be funneled through RSVP-TE proxy module 325. In some instances, node-oriented RSVP-TE messages 605 may be forwarded to appropriate RSVP-TE instances 340 (i.e., RSVP-TE message handler 330 and RSVP-TE protocol stack 335). In one implementation, interface-oriented RSVP-TE messages 610 may be received and transmitted directly by RSVP-TE instances 340. In some applications when external interfaces associated with the LSP leg may lie on two different chassis 205, RSVP-TE instance 340 on an ingress chassis may manage a LSP session. RSVP-TE instances 340 on an egress chassis may not creates states for the same, but may assist in forwarding. Additionally, or alternatively, in other implementations, RSVP-TE proxy module 325 may be capable of receiving interface-oriented RSVP messages and/or transmitting interface-oriented RSVP messages on behalf of RSVP-TE instances 340 and/or other nodes 120.

Under this distributed framework, RSVP-TE fast-forwarding of RSVP-TE messages may be directly handled by each RSVP-TE protocol stack 335, which relieves processing overhead with respect to RSVP-TE proxy module 325. For example, received interface-oriented RSVP-TE messages having a specific unicast (e.g., unicast IP address) or a specific multicast (e.g., multicast IP address) may be processed directly by RSVP-TE instances, without RSVP-TE proxy module 325 intervention. Similarly, transmitted interface-oriented RSVP-TE messages may be sent directly on an appropriate external interface (e.g., unicast IP) for numbered interfaces, and for unnumbered interfaces, multicast IP may be used. In such an implementation, RSVP-TE proxy module 325 may not see interface-oriented RSVP-TE messages being exchanged between RSVP-TE instance 340 and neighbor RSVP-TE instances associated with other nodes 120. Additionally, an RSVP-TE instance 340 associated with one chassis 205 may communicate with an RSVP-TE instance 340 associated with another chassis 205. Each RSVP-TE instance 340 may need to update its local session and forwarding session look-up tables. Additionally, each RSVP-TE message handler module 330 may update RSVP-TE proxy module 325 with their local LSP session/neighbor message ID information.

Node-oriented RSVP-TE messages may be transmitted, via RSVP-TE proxy module 325, to an external interface using unicast (e.g., unicast IP) based on, for example, a router ID or a switch ID). Node-oriented RSVP-TE messages may be received, via RSVP-TE proxy module 325, may be utilizing unicast (e.g., unicast IP) based on, for example, a router ID or a switch ID. RSVP-TE proxy module 325 may also receive interface-oriented RSVP-TE messages, which may be forwarded to RSVP-TE instances 340.

Figure 9A:
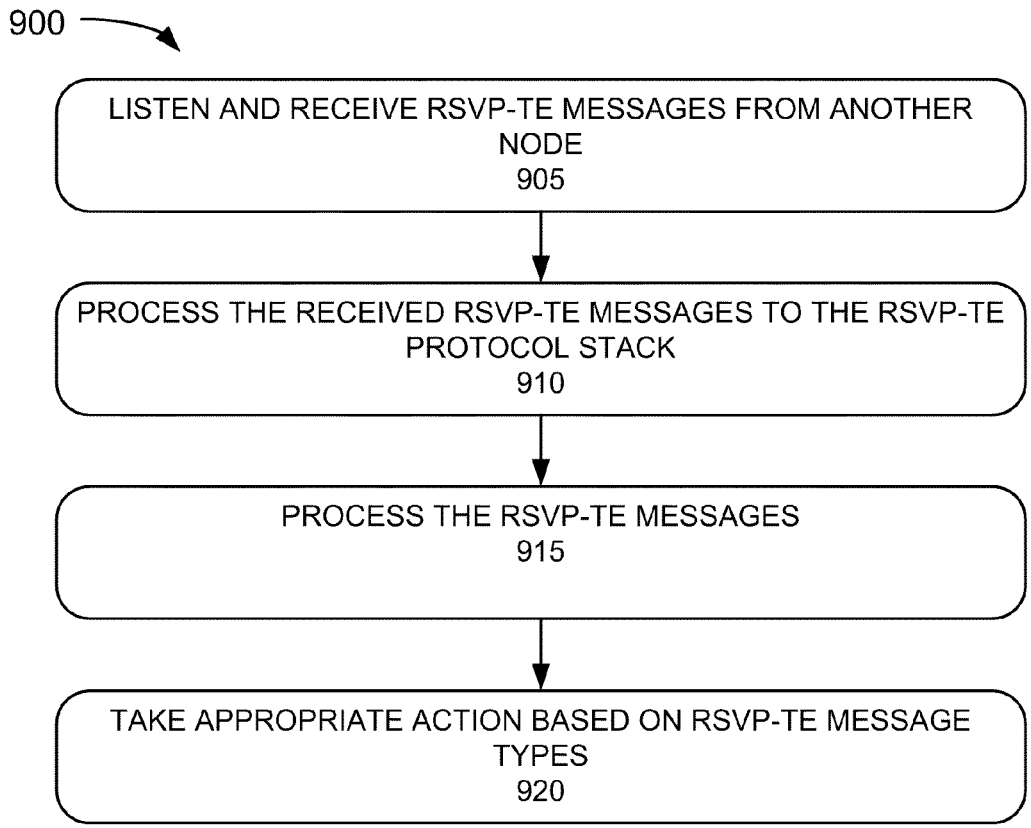
FIG. 9A is a flow diagram illustrating an exemplary process for receiving RSVP-TE messages in the distributed fashion.

FIG. 9A is a diagram of an exemplary process 900 for receiving RSVP-TE messages in a distributed fashion. In one implementation, process 900 may be performed by RSVP-TE instances 340 that receive RSVP-TE messages directly from other nodes 120.

Process 900 may include listening and receiving RSVP-TE messages from another node (block 905). For example, RSVP-TE message handler module 330 may listen and receive RSVP-TE messages coming in on numbered interfaces (e.g., unicast IP) or not numbered interfaces (e.g., multicast IP, when pre-assigned for the interface). In one implementation, the received RSVP-TE messages may correspond to interface-oriented RSVP-TE messages.

The received RSVP-TE messages may be passed to an RSVP-TE protocol stack (block 910). For example, RSVP-TE message handler module 330 may pass the received RSVP-TE messages to RSVP-TE protocol stack 335.

The RSVP-TE messages may be processed (block 915). RSVP-TE protocol stack 335 may process the RSVP-TE messages. The processing of the RSVP-TE messages may depend on the type RSVP-TE messages. For example, interface-oriented RSVP-TE messages may include a Path message, a Path-error message, a Reservation message, etc.

Appropriate action may be taken based on a message type (block 920). For example, RSVP-TE protocol stack 335 may perform various operations based on the processing of the RSVP-TE message. For example, these operations may relate to path setup, path teardown, reservation, etc.

Although FIG. 9A illustrates an exemplary process 900, in other implementations, fewer, additional, and/or different operations than those described, may be performed.

Figure 9B:
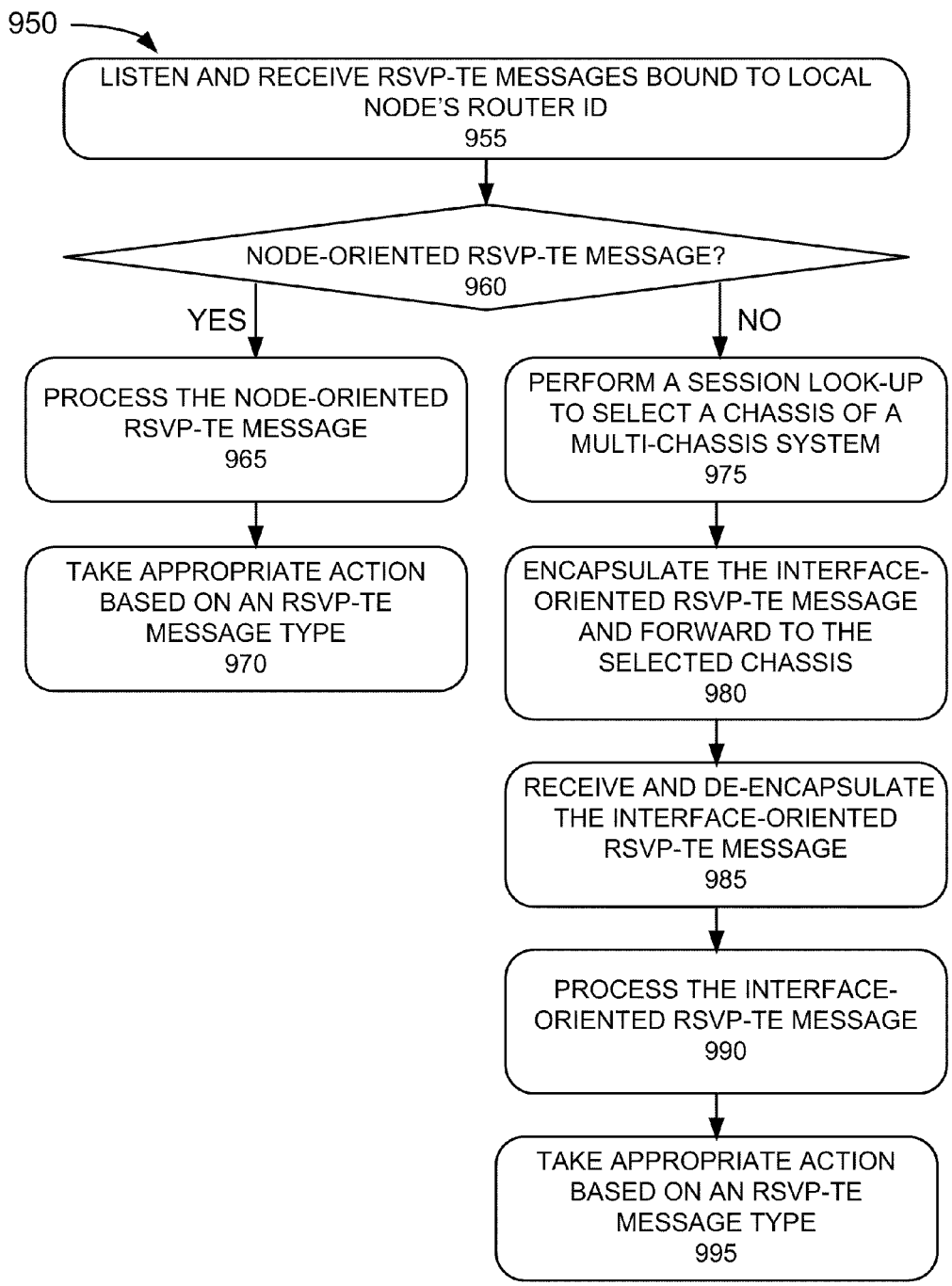
FIG. 9B is a flow diagram illustrating another exemplary process for receiving RSVP-TE messages in the distributed fashion.

FIG. 9B is a flow diagram illustrating an exemplary process 950 for receiving RSVP-TE messages in the distributed fashion. In one implementation, process 950 may relate to RSVP-TE messages being received from other nodes 120, via RSVP-TE proxy module 325.

Process 950 may include listening and receiving RSVP-TE messages from another node (block 955). For example, RSVP-TE proxy module 325 may listen and receive RSVP-TE messages bound to node's 120 router ID or switch ID.

It may be determined whether the RSVP-TE message is a node-oriented RSVP-TE message (block 960). For example, RSVP-TE proxy module 325 may determine whether the received RSVP-TE message is a node-oriented RSVP-TE message or an interface-oriented RSVP-TE message. As previously described, in one implementation, node-oriented RSVP-TE messages may include, for example, HELLO messages, ACK messages, SRefresh messages, Notify messages, and Reservation-Confirmation messages, and interface-oriented RSVP-TE messages may include, for example, Path messages, Path-error messages, Path-tear messages, Reservation messages, Reservation error messages, Reservation-tear messages, and Recovery-path messages.

If it is determined that the RSVP-TE message is a node-oriented RSVP-TE message (block 960—YES), the node-oriented RSVP-TE message may be processed (block 960). For example, RSVP-TE proxy module 325 may process the node-oriented RSVP-TE message. The processing of the node-oriented RSVP-TE message may depend on the type of node-oriented RSVP-TE message (e.g., a HELLO message, an ACK message, etc.).

Appropriate action may be taken based on a message type (block 970). For example, RSVP-TE proxy module 325 may perform various operations based on the processing of the node-oriented RSVP-TE message. For example, these operations may relate to adjacency management, recovery management, etc., depending on the type of node-oriented RSVP-TE message.

If it is determined that the RSVP-TE message is not a node-oriented RSVP-TE message (block 960—NO), a session look-up may be performed to select a chassis of a multi-chassis system (block 975). For example, RSVP-TE proxy module 325 may perform a look-up in the session look-up table to select the appropriate chassis 205 (i.e., the RSVP-TE instance 340) to process the received interface-oriented RSVP-TE message. As previously described, in one implementation, the session look-up table may include a mapping of an RSVP-TE protocol stack 335 to session information (e.g., egress IP, extended tunnel ID, tunnel ID and/or LSP ID).

The interface-oriented RSVP-TE may be encapsulated based on the session look-up (block 980). For example, as previously described and illustrated with respect to FIGS. 5A and 5B, RSVP-TE proxy module 325 may encapsulate the received interface-oriented RSVP-TE message with IP header 505 and RIME header 510 to create a RIME message 500. IP header 505 may include, for example, a unique, local IP address that corresponds to the appropriate RSVP-TE message handler module 330 to which the received interface-oriented RSVP-TE message is destined. Additionally, RSVP-TE proxy module 325 may add RIME header 510 that includes, among other things, message type 530, message action 535, incoming interfaces 540, outgoing interfaces 545, and RSVP-TE protocol message (including IP header) 555. RSVP-TE proxy module 325 may forward the encapsulated, interface-oriented RSVP-TE message to the selected chassis 205 (i.e., the selected RSVP-TE instance 340).

The encapsulated, interface-oriented RSVP-TE message may be received and de-encapsulated (block 985). For example, RSVP-TE message handler module 330 may receive the encapsulated, interface-oriented RSVP-TE message and de-encapsulate the encapsulated, interface-oriented RSVP-TE message. RSVP-TE message handler module 330 may pass the de-encapsulated, interface-oriented RSVP-TE message to RSVP-TE protocol stack 335 for processing.

The interface-oriented RSVP-TE message may be processed (block 990). RSVP-TE protocol stack 335 may process the de-encapsulated, interface-oriented RSVP-TE message. The processing of the de-encapsulated, interface-oriented RSVP-TE message may depend on the type of interface-oriented RSVP-TE message (e.g., a Path message, a Path-error message, a Reservation message, etc.).

Appropriate action may be taken based on a message type (block 955). For example, RSVP-TE protocol stack 335 may perform various operations based on the processing of the interface-oriented RSVP-TE message. For example, these operations may relate to path setup, path teardown, reservation, etc.

Although FIG. 9B illustrates an exemplary process 950, in other implementations, fewer, additional, and/or different operations than those described, may be performed.

Figure 10:
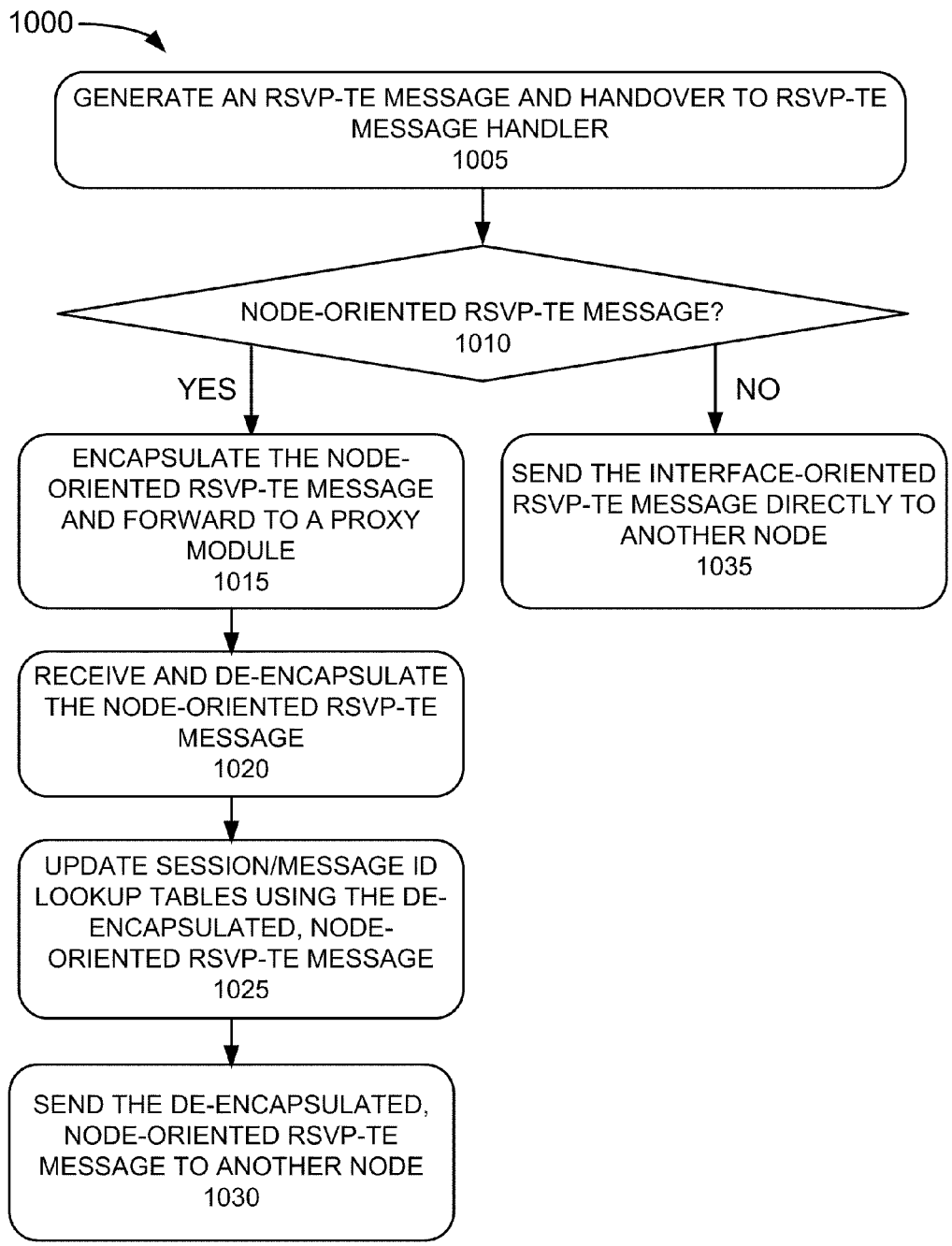
FIG. 10 is a flow diagram illustrating an exemplary process for transmitting RSVP-TE messages in the distributed fashion.

FIG. 10 is a flow diagram illustrating an exemplary process 1000 for transmitting RSVP-TE messages in the distributed fashion. In one implementation, process 1000 may relate to RSVP-TE messages being transmitted from RSVP-TE instances 340.

Process 1000 may include generating an RSVP-TE message (block 1005). For example, RSVP-TE protocol stack 335 may generate an RSVP-TE message. In one instances, the RSVP-TE message may correspond to a node-oriented RSVP-TE message and, in other instances, the RSVP-TE message may correspond to an interface-oriented RSVP-TE message. RSVP-TE protocol stack 335 may pass the generated RSVP-TE message to RSVP-TE message handler 330.

It may be determined whether the RSVP-TE message is a node-oriented RSVP-TE message (block 1010). For example, RSVP-TE message handler module 330 may determine whether the received RSVP-TE message is a node-oriented RSVP-TE message or an interface-oriented RSVP-TE message. As previously described, in one implementation, node-oriented RSVP-TE messages may include, for example, HELLO messages, ACK messages, SRefresh messages, Notify messages, and Reservation-Confirmation messages, and interface-oriented RSVP-TE messages may include, for example, Path messages, Path-error messages, Path-tear messages, Reservation messages, Reservation error messages, Reservation-tear messages, and Recovery-path messages.

If it is determined that the RSVP-TE message is a node-oriented message (block 1010—YES), the node-oriented RSVP-TE may be encapsulated (block 1015). For example, RSVP-TE message handler module 330 may encapsulate the node-oriented RSVP-TE message into a RIME message 500, as previously described. RSVP-TE message handler module 330 may forward the encapsulated, node-oriented RSVP-TE message to RSVP-TE proxy module 325.

The encapsulated RSVP-TE message may be received and de-encapsulated (block 1020). For example, RSVP-TE proxy module 325 may receive the encapsulated, node-oriented RSVP-TE message and de-encapsulate the encapsulated, node-oriented RSVP-TE message.

Session and message ID lookup tables may be updated based on the RSVP-TE message (block 1025). For example, RSVP-TE proxy module 325 may update session look-up table and/or message ID look-up table based on a content of the RSVP-TE message. For example, as previously described, the forwarding session look-up table may include an egress IP address, an extended tunnel ID, a tunnel ID, and/or an LSP ID that is mapped to an RSVP-TE protocol stack 335 (i.e., a local RSVP-TE instance 340).

The RSVP-TE message may be forwarded to another node (block 1030). For example, RSVP-TE proxy module 325 may process and/or forward the de-encapsulated, node-oriented RSVP-TE message to another node 120, in accordance with the information contained in the RSVP-TE message.

If it is determined that the RSVP-TE message is not a node-oriented message (block 1010—NO), the interface-oriented RSVP-TE may directly send the interface-oriented RSVP-TE message to the other node (block 1035). For example, RSVP-TE message handler module 330 may send the interface-oriented RSVP-TE message directly to the other node 120, instead of via RSVP-TE proxy module 325.

Although FIG. 10 illustrates an exemplary process 1000, in other implementations, fewer, additional, and/or different operations than those described, may be performed.

As previously described, RSVP-TE messages may be received and transmitted, in the distributed fashion, in a manner similar to that of the centralized fashion. For example, RSVP-TE messages may be received and transmitted via RSVP-TE proxy module 325. RIME messages 500 may be created for the exchange of RSVP-TE messages between local distributed RSVP-TE instances 340 and RSVP-TE proxy module 325.

Message ID and Tunnel ID Management

RSVP-TE messages may include a message identifier (ID) so that a message sequence may be maintained. However, in a typical message ID scheme, message IDs are managed on a node level. In the message ID scheme described herein, additional information may be used since node 120 includes multiple chassis 205.

Figure 11:
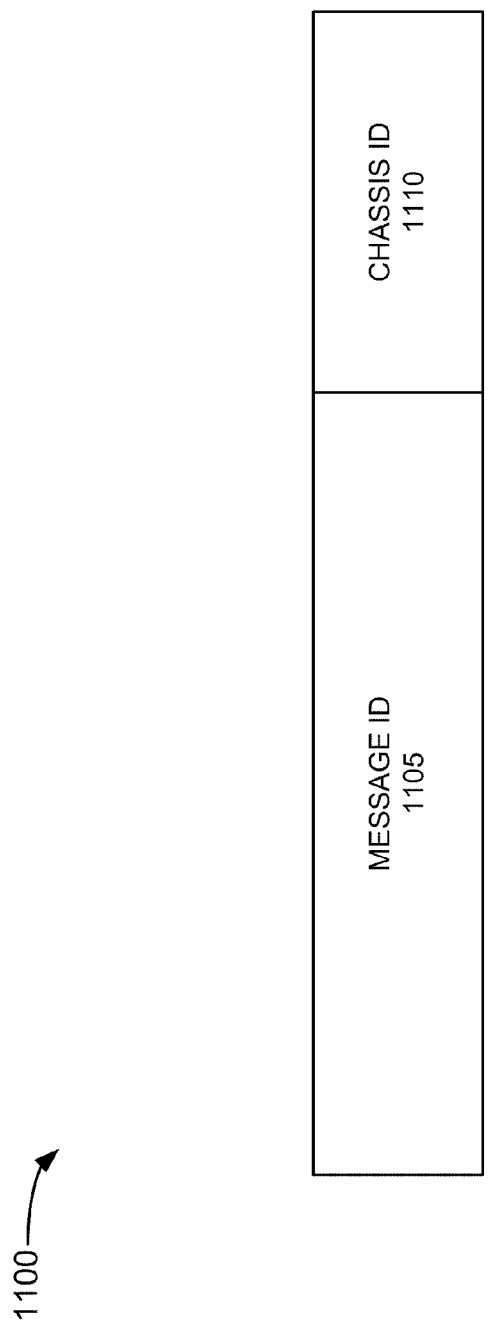
FIG. 11 is a diagram illustrating an exemplary message ID format which may be used for RSVP-TE messages.

FIG. 11 is a diagram illustrating an exemplary message ID format which may be used for RSVP-TE messages. For example, distributed RSVP-TE instance 335 may generate RSVP-TE messages according to the exemplary message ID format 1100.

As illustrated in FIG. 11, message ID format 1100 may include the following fields: a message ID 1105 and a chassis ID 1110. Message ID 1105 may include information that indicates a message identifier (e.g., a number). Message ID 1105 may be utilized to maintain message sequencing and/or detect out-of-order RSVP-TE messages. The message ID space may be, for example, 24 bits. In one implementation, message ID 1105 may be encoded as the most significant bits (MSB).

Chassis ID 1110 may include information that indicates a chassis ID. For example, node 120 may include multiple chassis 205 (e.g., chassis 205-1 through 205-X). Chassis ID 1110 may identify a particular chassis 205 associated with distributed RSVP-TE instance 340. Based on message ID 1105 and chassis ID 1110, a sequence of messages may be maintained on each chassis 205. The chassis ID space may be, for example, 8 bits. In one implementation, chassis ID 1110 may be encoded as the least significant bits (LSB).

Each LSP may be assigned a unique tunnel ID. Different techniques may be used to manage the allocation of tunnel IDs associated with LSPs on the multi-chassis node 120. In one embodiment, each distributed RSVP-TE instance 340 may reserve tunnel IDs from a global space or pool of tunnel IDs. Each distributed RSVP-TE instance 340 may manage their reserved tunnel IDs with respect to their LSPs. Each distributed RSVP-TE instance 340 may re-allocate tunnel IDs from the global space when the number of unallocated tunnel IDs reaches a certain threshold (e.g., below 20% of the total tunnel IDs reserved). Conversely, when the number of unallocated tunnel IDs reaches a certain threshold (e.g., above 50% of the total tunnel IDs reserved), each distributed RSVP-TE instance 340 may re-allocate a surplus of the tunnel IDs back to the global space. The number of tunnel IDs each distributed RSVP-TE instance may reserve may be a user-configurable parameter.

HELLO Adjacency Management

RSVP-TE HELLO protocol may be used to determine the ability to reach neighbors (i.e., other nodes 120), as well as control channel failure detection and node failure detection. RSVP-TE proxy module 325 and RSVP-TE message handler modules 330 may maintain a HELLO adjacency between distributed RSVP-TE instances 340 and neighbor RSVP-TE instances.

Figure 12:
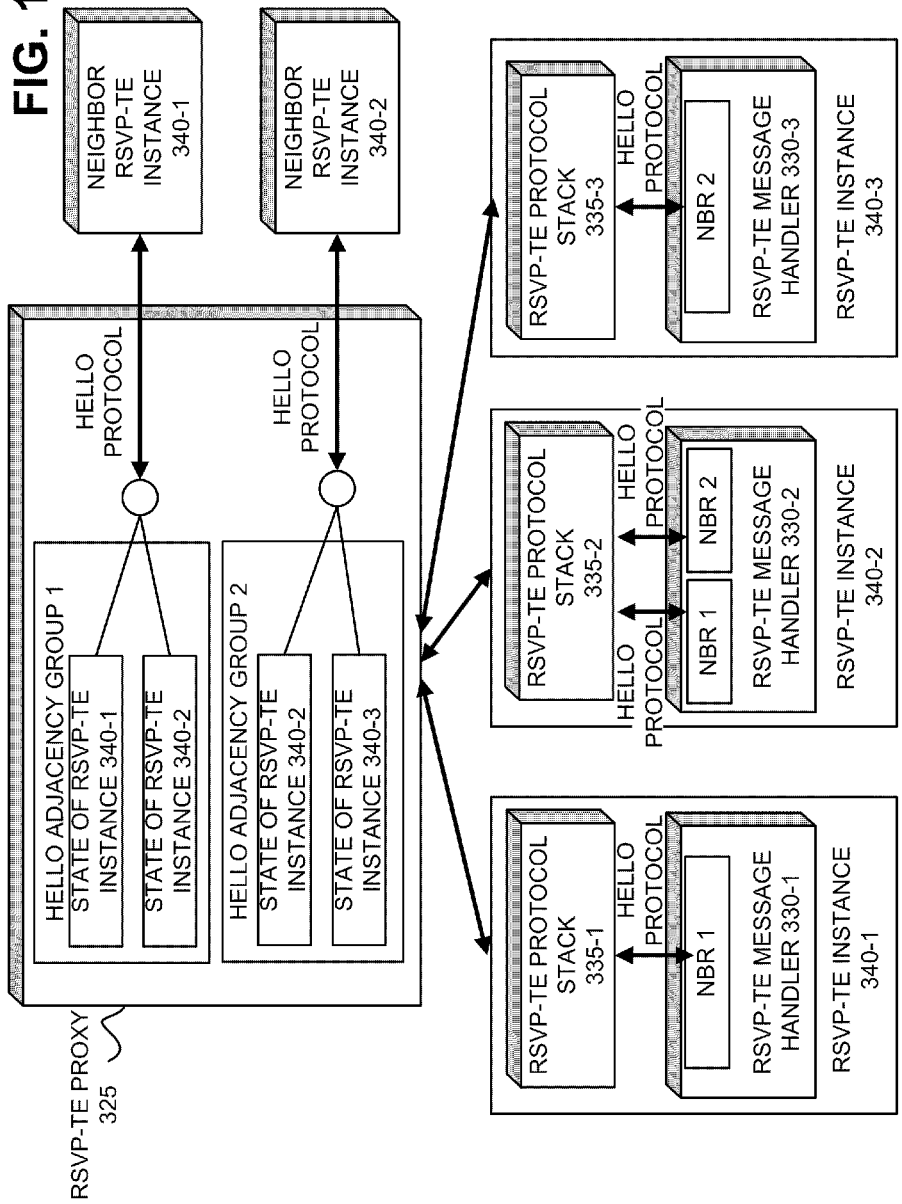
FIG. 12 is a diagram of an exemplary RSVP-TE HELLO adjacency arrangement.

FIG. 12 is a diagram illustrating an exemplary arrangement for HELLO adjacency management. As illustrated, in one embodiment, RSVP-TE proxy module 325 may maintain HELLO adjacency groups with respect to neighbor RSVP-TE instances 340-1 and 340-2 (referred to generally as neighbor RSVP-TE instance 340). For example, neighbor RSVP-TE instance 340-1 may be associated with other node 120 and neighbor RSVP-TE instance 340-2 may be associated with yet another node 120. In this arrangement, a custom HELLO mechanism may be implemented. For example, state information may be exchanged between RSVP-TE proxy module 325 and neighbor RSVP-TE instances 340, state information may be exchanged between RSVP-TE proxy module 325 and local RSVP-TE instances 340, and state information may be exchanged between RSVP-TE message handler module 330 and RSVP-TE protocol stack 335.

In an exemplary implementation, RSVP-TE proxy module 325 may exchange its own state information with neighbor RSVP-TE instance 340. RSVP-TE proxy module 325 may also exchange state information associated with local RSVP-TE instances 340 with neighbor RSVP-TE instance 340. Local RSVP-TE instances 340 and RSVP-TE proxy module 325 may exchange state information. Additionally, RSVP-TE protocol stacks 335 may receive state information associated with RSVP-TE proxy module 325 and neighbor RSVP-TE instance 340, and transmit its own state information via RSVP-TE message handler module 330. In such an implementation, the HELLO adjacency mechanism may be implemented as a node-oriented mechanism, such that state information is funneled through RSVP-TE proxy module 325.

In an exemplary implementation, each local RSVP-TE instance 340 (i.e., local RSVP-TE instance on node 120) that may need to communicate to a given neighbor RSVP-TE instance 340 may register with RSVP-TE proxy module 325. For example, RSVP-TE message handlers 330 may register with RSVP-TE proxy module 325 for neighbor RSVP-TE state information. Alternatively, RSVP-TE instance 340 may not need to register with RSVP-TE proxy module, but provide state information to RSVP-TE proxy module 325.

In one implementation, upon registration, RSVP-TE proxy module 325 may add neighbor RSVP-TE instance 340 to a specific HELLO adjacency group and track the state of neighbor RSVP-TE instance 340. RSVP-TE proxy module 325 may determine the state of local RSVP-TE instance 340 based on state information from RSVP-TE message handler module 330. Alternatively, RSVP-TE proxy module 325 may create a HELLO adjacency group without registration, and based on the state information provided each RSVP-TE instance 340.

RSVP-TE proxy module 325 may process the states of the participating local RSVP-TE instances 340 and neighbor RSVP-TE instances 340 and determine a consolidated RSVP-TE state (e.g., a node level state) for a given HELLO adjacency group. Based on the consolidated RSVP-TE state information, RSVP-TE proxy module 325 may run the HELLO protocol with respect to the neighbor RSVP-TE instances 340. Neighbor RSVP-TE state information may be updated (e.g., periodically) to the local RSVP-TE instances 340 via RSVP-TE message handlers 330.

Restart Detection and Recovery

When at least one local RSVP-TE instance is registered (e.g., with a HELLO adjacency group) and up-and-running, RSVP-TE proxy module 325 may begin the HELLO protocol with a neighbor RSVP-TE instance 340 and exchange HELLO messages with the neighbor RSVP-TE instance 340 to establish a HELLO adjacency. RSVP-TE proxy module 325 may pass the state of the neighbor RSVP-TE instance 340 to a local RSVP-TE instance (i.e., local RSVP-TE instance 340) via RSVP-TE message handler module 330.

Whenever states of one or more local RSVP-TE instances are up-and-running, RSVP-TE proxy module 325 may wait to allow other local RSVP-TE instances to come to an up-and-running state. RSVP-TE proxy module 325 may mimic the recovery type (e.g., a control channel recovery or a node recovery) to neighbor RSVP-TE instance 340. When the state of all RSVP-TE instances, which belong to a HELLO adjacency group, goes down, RSVP-TE proxy module 325 may halt the HELLO protocol to neighbor RSVP-TE instance 340. RSVP-TE proxy module 325 may have knowledge that local RSVP-TE instances are down based state information from RSVP-TE message handler(s) 330.

As previously described, RSVP-TE message handler module 330 may register with RSVP-TE proxy module 325 and provide state information to RSVP-TE proxy module 325. Until neighbor RSVP-TE state information is received, RSVP-TE message handler module 330 may not start the HELLO protocol. Once the neighbor RSVP-TE state information is received, RSVP-TE message handler module 330 may begin the HELLO protocol. RSVP-TE message handler module 330 may detect a neighbor adjacency drop and a restart reason (e.g., a control channel failure or a node failure) and mimic the same information to RSVP-TE protocol stack 335. For example, RSVP-TE message handler module 330 may detect a downed neighbor RSVP-TE instance 340 based on state information from RSVP-TE proxy module 325. RSVP-TE message handler module 330 may relay this information to RSVP-TE protocol stack 335.

Neighbor Failure Detection

When a neighbor RSVP-TE instance 340 goes down because of control channel failure or node failure, RSVP-TE proxy module 325 may detect a HELLO timeout and bring down the neighbor HELLO adjacency. RSVP-TE message handler(s) 330 participating in the HELLO adjacency group may also detect the HELLO timeout (e.g., based on a communication between RSVP-TE proxy module 325 and RSVP-TE message handler(s) 330) and bring down the HELLO adjacency with respect to their local RSVP-TE instance(s). When neighbor HELLO adjacency is re-established, RSVP-TE message handler module 330 may independently determine the failure reason (e.g., using neighbor state information received from RSVP-TE proxy module 325) and mimic the same to the local RSVP-TE instance(s).

Local Failure Detection

When administrative chassis 205 or all of the local RSVP-TE instances associated with a HELLO adjacency group go down because of node failure or control channel failure, neighbor RSVP-TE instance 340 may detect a HELLO timeout and bring down the local HELLO adjacency. When administrative chassis 205 and at least one of the local RSVP-TE instances comes back up to a running state, RSVP-TE proxy module 325 may rebuild the HELLO adjacency group and restart the HELLO protocol with respect to neighbor RSVP-TE instance 340. Neighbor RSVP-TE instance 340 may detect the failure reason and assist in the recovery of the HELLO adjacency.

When at least one of the local RSVP-TE instances, which belongs to a HELLO adjacency group, goes down, RSVP-TE proxy module 325 may not abort the HELLO protocol to neighbor RSVP-TE instance 340. Rather, when the at least one local RSVP-TE instance comes back up, RSVP-TE proxy module 325 may mimic the failure condition to neighbor RSVP-TE instance 340. For example, when at least one local RSVP-TE instance may be recovering from a node failure (e.g., a chassis reboot or a switchover), then the node failure condition may be mimicked towards the associated neighbor RSVP-TE instance 1105.

RSVP-TE Messaging

As previously described, the RSVP-TE provides for various RSVP-TE messages, such as, a Path message, a Path-error message, a Path-tear message, a Reservation message, etc. Described below are exemplary RSVP-TE message handling schemes for interface-oriented RSVP-TE messages and node-oriented RSVP-TE messages.

In one implementation, interface-oriented RSVP-TE messages may be generated by RSVP-TE protocol stack 325. RSVP-TE message handler module 330 may transmit an interface-oriented RSVP-TE message via an interface using, for example, unicast interface IP or multicast IP, when the distributed framework is utilized. Conversely, RSVP-TE message handler module 330 may transmit an interface-oriented RSVP-TE message via RSVP-TE proxy module 325, when the centralized framework is utilized. In either case, session information may be need to be updated and/or provided to RSVP-TE proxy module 325, so that reverse forwarding of RSVP-TE messages may occur.

With respect to receiving interface-oriented RSVP-TE messages, RSVP-TE message handler module 330 may directly receive interface-oriented RSVP-TE messages, when the distributed framework is utilized. Conversely, interface-oriented RSVP-TE messages may be received and forwarded by RSVP-TE proxy module 325, to RSVP-TE instances 340, based on session look-up, when the centralized framework is utilized.

As previously described, node-oriented RSVP-TE messages may include, for example, ACK messages, SRefresh messages, Notify messages, and Reservation-Confirmation messages, and HELLO messages. Node-oriented RSVP-TE messages may be received and/or transmitted via RSVP-TE proxy module 325.

In one implementation, an ACK message may be generated by a local RSVP-TE instance 340 and sent to a neighbor node 120 over a unicast IP interface via RSVP-TE proxy module 325. The ACK message may be received from a neighbor RSVP-TE instance by RSVP-TE proxy module 325. RSVP-TE proxy module 325 may inspect the message-IDs contained in the ACK message. In some instances, the message-IDs may belong to multiple local RSVP-TE instances. In such instances, RSVP-TE proxy module 325 may consolidate the received message-IDs based on a local RSVP-TE instance basis and generate separate ACK messages. RSVP-TE proxy module 325 may send the ACK messages using RIME messages 500 to the appropriate local RSVP-TE instances 340 via RSVP-TE message handlers 330.

Message-ID ACK/NACK objects pertaining to a neighbor node 120 may be embedded in subsequent RSVP-TE messages (e.g., piggy-backed) sent to the neighbor node 120. However, under the distributed RSVP-TE architecture, message-ID ACK/NACK objects, which may be piggy-backed in an RSVP-TE message, may not belong to the same RSVP-TE instance 340 that may process the given RSVP-TE message. Accordingly, in one embodiment, when RSVP-TE message handlers 330 and/or RSVP-TE proxy module 325 receive a RSVP-TE message, RSVP-TE message handlers 330 and/or RSVP-TE proxy module 325 may pull out message-ID ACK/NACK objects from the RSVP-TE message and consolidate them based on the local RSVP-TE instances. RSVP-TE message handlers 330 and/or RSVP-TE proxy module 325 may generate separate or individual ACK messages using RIME messages 500 to the appropriate local RSVP-TE instance 340

A Notify message may be generated by the local RSVP-TE instance and may be sent to a destination router ID using a unicast IP interface via RSVP-TE proxy module 325. A Notify message may be sent by a downstream or upstream node 120 and received by RSVP-TE proxy module 325 on node 120. RSVP-TE proxy module 325 may forward the Notify message, using RIME message 500, to the appropriate local RSVP-TE instance based on session information.

A Reservation confirmation message may be generated by the local RSVP-TE instance and may be sent to a destination router ID using a unicast IP interface via RSVP-TE proxy module 325. A Reservation confirmation message may be sent by a downstream or upstream node 120 and received by RSVP-TE proxy module 325 on node 120. RSVP-TE proxy module 325 may forward the Reservation confirmation message, using RIME message 500, to the appropriate local RSVP-TE instance based on session information.

Node 120 may receive or send messages other than RSVP-TE messages. For example, node 120 may send Refresh messages. A Refresh message may include a set of message-ID objects that identify Path and Reservation states that should be refreshed. Refresh messages may be sent or received in a manner similar to Path and Reservation messages.

RSVP-TE State Recovery

RSVP-TE state recovery may be implemented based on Request For Comments (RFC)-3473. SRefresh messages may be used for control channel recovery and Path/Reservation Refresh messages (e.g., with Recovery label) may be used for nodal recovery.

When recovery is based on a control plane failure, associated with a neighbor node 120, the failure condition may be sent to the local RSVP-TE instance via RSVP-TE proxy module 325 (e.g., using the HELLO protocol). The local RSVP-TE instance may react by sending SRefresh messages toward the neighbor node 120 via RSVP-TE proxy module 325. Based on neighbor node 120 NACK, Path/Reservation Refresh messages may be generated.

When recovery is based on a node failure, associated with a neighbor node 120, RSVP-TE proxy module 325 may clear neighbor message-ID look-up entries. The failure condition may be sent to local RSVP-TE instance, via RSVP-TE proxy module 325, using the HELLO protocol. The local RSVP-TE instance may start recovery procedures. Each local RSVP-TE instance may send Path and Reservation states to neighbor node 120 via a multicast interface or a unicast IP interface.

When recovery is based on a control plane failure associated with node 120 (e.g., on local RSVP-TE instances), RSVP-TE proxy module 325 may clear neighbor message-ID look-up entries for the local RSVP-TE instances recovering. The failure condition may be sent to the neighbor RSVP-TE instances using the HELLO protocol. Neighbor RSVP-TE instances may react by sending SRefresh messages toward node 120. RSVP-TE proxy module 325 may receive the SRefresh messages and NACKs all the message-IDs not known to it. Neighbor RSVP-TE instances may then send Path and Reservation messages for all NACKed message-IDs.

When recovery is based on a node failure associated with node 120, RSVP-TE proxy module 325 may initiate a warm reboot or power cycle. RSVP-TE proxy module 325 may wait a period of time for all local RSVP-TE instances to come up. Once all of the local RSVP-TE instances come up, RSVP-TE proxy module 325 may start the HELLO protocol. Neighbor node 120 may detect the node failure and start a recovery procedure. Neighbor node 120 may send all Path and Reservation states to node 120. RSVP-TE proxy module 325 may receive the Path and Reservation states and rebuild its tables. RSVP-TE proxy module 325 may forward the Path and Reservation states to all of the local RSVP-TE instances.

An SRefresh message may be generated by a local RSVP-TE instance. The SRefresh message may be sent to the appropriate destination router/switch ID over a unicast IP interface via RSVP-TE proxy module 325.

An SRefresh message from an RSVP-TE neighbor node 120 may be received by RSVP-TE proxy module 325. RSVP-TE proxy module 325 may send an acknowledgement message and process the SRefresh message. For example, RSVP-TE proxy module 325 may inspect the message-IDs contained in the SRefresh message. Based on message-ID look-up table, RSVP-TE proxy module 325 may consolidate the received message-IDs based on a local RSVP-TE instance basis and generate separate SRefresh messages to the appropriate RSVP-TE message handler modules 330. RSVP-TE proxy module 325 may send the SRefresh messages using RIME messages 500 to the appropriate local RSVP-TE instances via RSVP-TE message handlers 330. The locally generated SRefresh messages may not include the message-ID objects.

Building Look-Up Information

As previously described, RSVP-TE proxy module 325 may build a session look-up table and a message-ID look-up table. The session look-up table may include information with respect to sessions (e.g., an egress IP address, an extended tunnel ID, a tunnel ID, and/or an LSP ID, which may be mapped to a local RSVP-TE instance). The message-ID look-up table may include an identifier for RSVP-TE messages (e.g., a neighbor message ID may be mapped to a local RSVP-TE instance). RSVP-TE proxy module 325 may utilize these look-up tables for forwarding RSVP-TE messages and handling SRefresh messages.

RSVP-TE proxy module 325 may build the session look-up table based on RSVP-TE message handler module 330. For example, RSVP-TE message handler module 330 may build the session look-up information through Data Control (DC-RSVP) user exits, which supports RSVP-TE. RSVP-TE message handler module 330 may incrementally synchronize the session information with RSVP-TE proxy module 325 during normal operations and fully synchronize the session information with RSVP-TE proxy module 325 during boot-up and control plane toggle.

RSVP-TE proxy module 325 may build the message-ID look-up table when ACK messages are forwarded via RIME messages 500. When piggy-backed ACK messages are utilized, this approach may not work efficiently. In such instances, RSVP-TE message handler module 330 may snoop incoming Path and Reservation messages and then build the message-ID table. RSVP-TE message handler module 330 may update (e.g., periodically) RSVP-TE proxy module 325 with this information.

RSVP-TE message handler module 330 may build reverse forwarding session look-up tables for those sessions in which the local RSVP-TE instance participates but may not be owned by the local RSVP-TE instance (e.g., owned by source and/or destination RSVP-TE instance(s)). In one embodiment, the reverse forwarding session look-up table may be built based on the forwarding of interface-oriented RSVP-TE messages (e.g., Path and Reservation messages). If reverse forwarding session information is not available, when forwarding, RSVP-TE message handler module 330 may forward the RSVP-TE message to RSVP-TE proxy module 325 for re-routing. In such instances, RSVP-TE proxy module 325 may update reverse forwarding session information to the sending RSVP-TE message handler module 330 so that subsequent RSVP-TE messages may not be re-routed to RSVP-TE proxy module 325.

CONCLUSION

Implementations described herein may provide an architecture that includes an RSVP-TE instance to operate on each chassis of a multi-chassis node. Each RSVP-TE instance may manage LSP tunnels pertaining to its chassis. An administrative chassis may provide for node-level RSVP-TE consolidation, as well as manage adjacency, failure detection, and recovery mechanisms.

The foregoing description provides illustration and description, but is not intended to be exhaustive or to limit the invention to the precise form disclosed. Modifications and variations are possible in light of the above teachings or may be acquired from practice of the invention. For example, although embodiments described herein refer to the RSVP-TE, other resource reservation-based protocols may be utilized (e.g., RSVP and the like).

For example, while series of blocks have been described with regard to FIGS. 7A, 7B, 9A, 9B, and 10, the order of the blocks may be modified in other implementations. Further, non-dependent blocks may be performed in parallel.

Also, certain portions of the implementations have been described as "components" that perform one or more functions. The term "component," may include hardware, such as a processor, an application specific integrated circuit (ASIC), or a field programmable gate array (FPGA), or a combination of hardware and software.

Further, while implementations have been described in the context of an optical network, this need not be the case. These implementations may apply to any form of circuit-switching network.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device provided in a network, comprising:
    a first chassis, where the first chassis includes a first plurality of line cards and a first resource reservation protocol (RSVP) stack associated with network traffic carried by the first plurality of line cards, and
    a second chassis, where the second chassis includes a second plurality of line cards and a second RSVP stack associated with network traffic carried by the second plurality of line cards, where:
        the first chassis further includes:
            a proxy module, where the proxy module is to:
            receive a first RSVP message;
            determine whether the first RSVP message corresponds to a node-oriented RSVP message or an interface-oriented RSVP message; and
            pass the first RSVP message to the second RSVP stack when a determination is made that the first RSVP message is the interface-oriented RSVP message, the first RSVP message including a path reservation message that includes information indicative of a reservation of a path in the network; and
            process the first RSVP message when it is determined that the first RSVP message is the node-oriented RSVP message.

2. The network device of claim 1, where the proxy module is further to:
    select the second RSVP stack to receive the first RSVP message based on session information associated with the second RSVP stack.

3. The network device of claim 1, where when passing the first RSVP message, the proxy module is further to:
    encapsulate the first RSVP message with an additional header.

4. The network device of claim 3, where the additional header includes a field that specifies one of to forward the first RSVP message, to process the first RSVP message, or to reroute the first RSVP message.

5. The network device of claim 3, where the second chassis further includes a second message handler, where the second message handler is to:
    de-encapsulate the first RSVP message; and
    pass the de-encapsulated first RSVP message to the second RSVP stack.

6. The network device of claim 1, where the proxy module is further to:
    manage HELLO state information pertaining to other network devices with which the first RSVP stack and the second RSVP stack are communicating.

7. The network device of claim 6, where, when managing the HELLO state information, the proxy module is further to:
    maintain HELLO adjacency groups, where one of the HELLO adjacency groups includes the first RSVP stack and the second RSVP stack that are in communication with a same RSVP stack associated with one of the other network devices.

8. The network device of claim 6, where the proxy module is further to:
    manage failure detection and restart procedures, with respect to the second RSVP stack, based on the HELLO state information.

9. The network device of claim 1, where the second chassis further includes a second message handler, where:
    the second RSVP stack is to:
        generate a second RSVP message; and
    the second message handler is to:
        receive the second RSVP message from the second RSVP stack;
        determine whether the second RSVP message is the interface-oriented RSVP message or the node-oriented RSVP message;
        transmit the second RSVP message to another network device when it is determined that the second RSVP message is the interface-oriented RSVP message;
        encapsulate the second RSVP message; and
        pass the encapsulated RSVP message to the proxy module, when it is determined that the second RSVP message is the node-oriented RSVP message, where an encapsulation includes an additional header, the additional header including a field that specifies one of to forward the second RSVP message, to process the second RSVP message, or to reroute the second RSVP message.

10. The network device of claim 9, where the proxy module is further to:
    receive the encapsulated second RSVP message; and
    de-encapsulate the encapsulated second RSVP message; and
    forward the de-encapsulated second RSVP message to another network device.

11. The network device of claim 9, where the second message handler is further to:
    receive a third RSVP message from the other node, where the third RSVP message corresponds to the interface-oriented RSVP message; and
    pass the third RSVP message to the second RSVP stack.

12. The network device of claim 1, where the first chassis is further to:
    manage an allocation of tunnel identifiers for the second RSVP stack associated with the second chassis.

13. A method performed by a device in a network, comprising:
    receiving a first resource reservation protocol (RSVP) message by a first chassis having a first RSVP stack;
    determining, by the first chassis, whether the first RSVP message is a node-oriented RSVP message or an interface-oriented RSVP message;
    encapsulating, by the first chassis, the first RSVP message with an additional header, when it is determined that the first RSVP message is the interface-oriented RSVP message, the first RSVP message including a path reservation message that includes information indicative of a reservation of a path in the network;
    forwarding, by the first chassis, the encapsulated first RSVP message to a second chassis having a second RSVP stack; and
    processing, by the first chassis, the first RSVP message, when it is determined that the first RSVP message is the node-oriented RSVP message.

14. The method of claim 13, where the node-oriented RSVP message includes one of a HELLO message, an acknowledgement message, a summary refresh message, a notify message, or a reservation-confirmation message.

15. The method of claim 13, further comprising:
generating a session lookup table by the first chassis, where the session lookup table includes session information mapped to the second RSVP stack associated with the second chassis; and
forwarding the encapsulated first RSVP message to the second RSVP stack based on the session lookup table.

16. The method of claim 13, where the encapsulated first RSVP message includes an internal network address that corresponds to the second chassis.

17. The method of claim 13, further comprising:
de-encapsulating, by the second chassis, the encapsulated first RSVP message, and where the additional header indicates to the second RSVP stack, associated with the second chassis, to forward, process or reroute the de-encapsulated first RSVP message.

18. The method of claim 13, further comprising:
generating, by the second RSVP stack, a second RSVP message
determining, by the second chassis, whether the second RSVP message is the interface-oriented RSVP message or the node-oriented RSVP message;
transmitting the second RSVP message to another network device, when it is determined that the second RSVP message is the interface-oriented RSVP message; and
encapsulating the second RSVP message and passing the encapsulated second RSVP message to the first chassis, when it is determined that the second RSVP message is the node-oriented RSVP message.

19. The method of claim 18, further comprising:
receiving, by the first chassis, the encapsulated second RSVP message;
de-encapsulating, by the first chassis, the encapsulated second RSVP message;
updating, by the first chassis, a session table, where the session table includes session information associated with the second RSVP stack; and
transmitting, by the first chassis, the de-encapsulated RSVP message to another network device.

20. The method of claim 13, further comprising:
receiving, by the second RSVP stack, a third RSVP message, where the third RSVP message is the interface-oriented RSVP message, and where the third RSVP message is received from another network device and not received from the other network device via the first chassis; and
processing, by the second RSVP stack, the third RSVP message.

21. The method of claim 13, further comprising:
maintaining, by the first chassis, a pool of tunnel identifiers for label switching path tunnels;
reserving, by the second chassis, a portion of the pool of tunnel identifiers; and
utilizing, by second chassis, the reserved portion of tunnel identifiers for label switching path tunnels.

22. A device, comprising:
multiple chassis to provide routing or switching services, the multiple chassis including an administrative chassis and one or more shelf chassis, each chassis of the multiple chassis comprising:
a resource reservation protocol (RSVP) stack to provide resource reservation services to network links in a network handled by the chassis; and
a unique network address, and where the administrative chassis is to:
receive and transmit node-oriented RSVP messages from and to other devices; and
where the one or more shelf chassis are to:
receive and transmit interface-oriented RSVP messages from and to other devices, the receive and transmit interface-oriented RSVP message including a path reservation message that includes information indicative of a reservation of a path in the network; and
generate node-oriented RSVP messages, encapsulate the generated node-oriented RSVP messages and pass the encapsulated generated node-oriented messages to the administrative chassis.

23. The device of claim 22, where the administrative chassis is further to:
receive and transmit interface-oriented RSVP messages from and to other devices.

24. The device of claim 22, where the administrative chassis includes a proxy module, where the proxy module is to:
manage adjacency with respect to the one or more shelf chassis and other devices.

25. The device of claim 22, where the node-oriented RSVP messages include one or more of a HELLO message, an acknowledgement message, a summary refresh message, a notify message, or a reservation-confirmation message.

* * * * *